(12) United States Patent
Truong et al.

(10) Patent No.: US 12,359,757 B2
(45) Date of Patent: Jul. 15, 2025

(54) FLUID HANDLING COUPLINGS

(71) Applicant: Colder Products Company, Roseville, MN (US)

(72) Inventors: Loi T. Truong, Savage, MN (US); Randall S. Williams, Minneapolis, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 18/742,213

(22) Filed: Jun. 13, 2024

(65) Prior Publication Data

US 2024/0328551 A1  Oct. 3, 2024

Related U.S. Application Data

(63) Continuation of application No. 17/617,809, filed as application No. PCT/US2020/036588 on Jun. 8, 2020, now Pat. No. 12,038,113.

(60) Provisional application No. 62/859,558, filed on Jun. 10, 2019.

(51) Int. Cl.
*F16L 37/084* (2006.01)
*F16L 37/248* (2006.01)
*F16L 37/34* (2006.01)

(52) U.S. Cl.
CPC ......... *F16L 37/0841* (2013.01); *F16L 37/248* (2013.01); *F16L 37/34* (2013.01)

(58) Field of Classification Search
CPC ......... F16L 37/32; F16L 37/34; F16L 37/248; F16L 37/0841; F16L 29/04
See application file for complete search history.

(56) References Cited

U.S. PATENT DOCUMENTS

| | | |
|---|---|---|
| 4,942,901 A | 7/1990 | Vescovini |
| 5,052,725 A | 10/1991 | Meyer et al. |
| 5,645,302 A | 7/1997 | Horimoto |
| 5,899,228 A | 5/1999 | Smith |
| 6,050,544 A | 4/2000 | Meronek |
| 6,237,631 B1 | 5/2001 | Giesler et al. |
| 6,371,443 B1 | 4/2002 | Imai |
| 7,753,415 B2 | 7/2010 | Tiberghien et al. |
| 10,022,532 B2 | 7/2018 | Burdge |
| 2003/0145892 A1 | 8/2003 | Maldavs |
| 2005/0046178 A1 | 3/2005 | Sato et al. |

(Continued)

FOREIGN PATENT DOCUMENTS

| | | |
|---|---|---|
| CA | 2403145 | 3/2003 |
| CN | 1168171 | 12/1997 |

(Continued)

OTHER PUBLICATIONS

International Preliminary Report on Patentability in International Appln. No. PCT/US2020/036588, dated Dec. 23, 2021, 7 pages.

(Continued)

*Primary Examiner* — Zachary T Dragicevich
(74) *Attorney, Agent, or Firm* — Fish & Richardson P.C.

(57) ABSTRACT

Fluid couplings can be designed to prevent spillage of fluid when disconnecting the couplings after use. In some embodiments, the fluid couplings include internal valve components but no springs, or no springs in the fluid flow path. In some embodiments, the internal valve components of a male coupling and a female coupling can be designed to latch together in an abutted arrangement.

19 Claims, 24 Drawing Sheets

(56) References Cited

U.S. PATENT DOCUMENTS

| | | |
|---|---|---|
| 2007/0025811 A1 | 2/2007 | Wilhelm |
| 2007/0102923 A1 | 5/2007 | Niemela |
| 2007/0212588 A1 | 9/2007 | Kozu |
| 2011/0266790 A1 | 11/2011 | Abura et al. |
| 2013/0092271 A1 | 4/2013 | Downs et al. |
| 2013/0320668 A1 | 12/2013 | Cheon et al. |
| 2014/0261818 A1 | 9/2014 | Cruickshank et al. |
| 2017/0191595 A1 | 7/2017 | Van Scyoc |
| 2018/0256878 A1 | 9/2018 | Ciccone et al. |
| 2019/0137021 A1 | 5/2019 | Downs et al. |
| 2020/0032922 A1 | 1/2020 | Wilhelm |

FOREIGN PATENT DOCUMENTS

| | | |
|---|---|---|
| CN | 2361950 | 2/2000 |
| CN | 1644974 | 7/2005 |
| CN | 101052837 | 10/2007 |
| CN | 101548422 | 9/2009 |
| CN | 101568759 | 10/2009 |
| CN | 102537568 | 7/2012 |
| CN | 103975186 | 8/2014 |
| CN | 208204288 | 12/2018 |
| GB | 191006495 | 7/1910 |
| GB | 862945 | 3/1961 |
| WO | WO 2018/138286 | 8/2018 |

OTHER PUBLICATIONS

International Search Report and Written Opinion in International Appln. No. PCT/US2020/036588, dated Sep. 9, 2020, 10 pages.

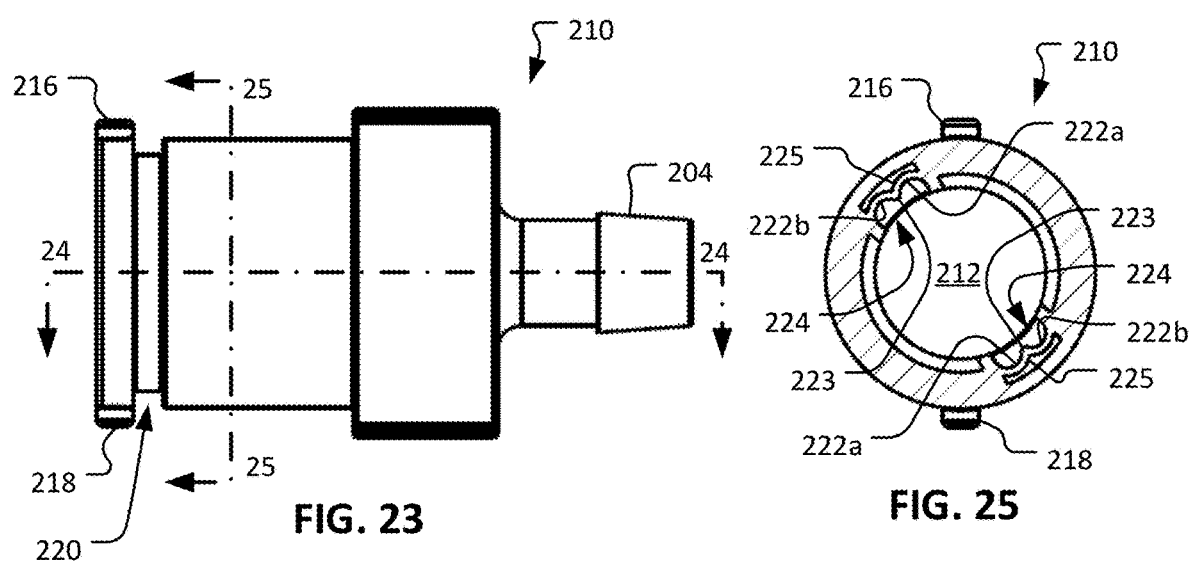
FIG. 23
FIG. 25
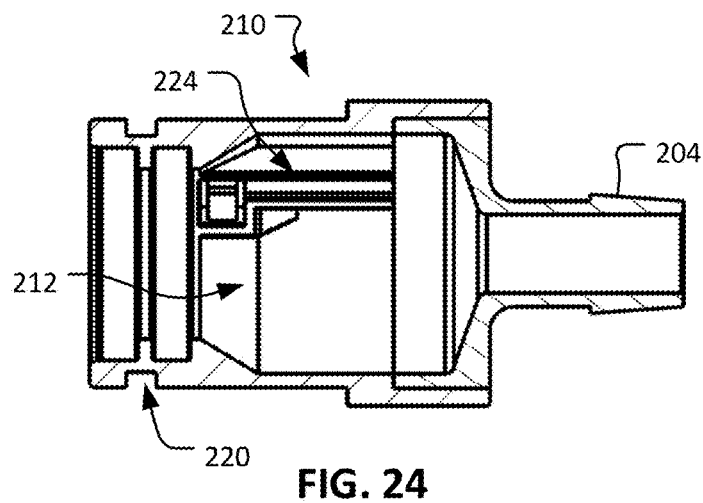
FIG. 24

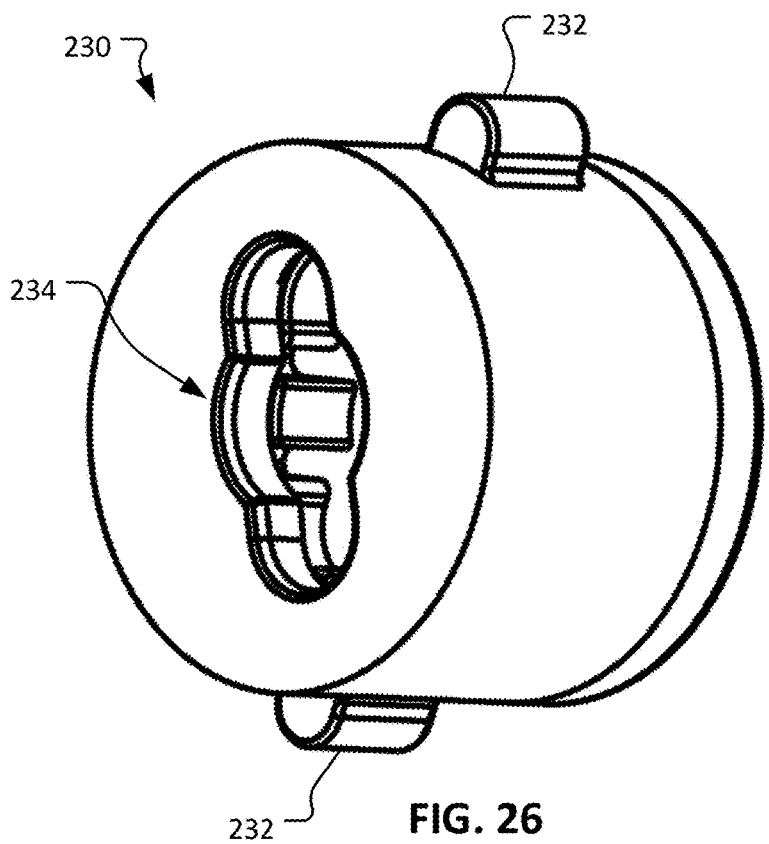
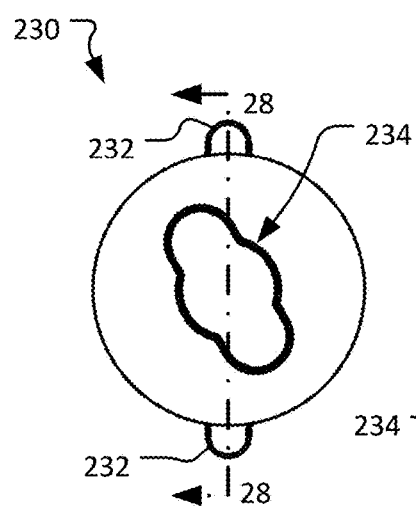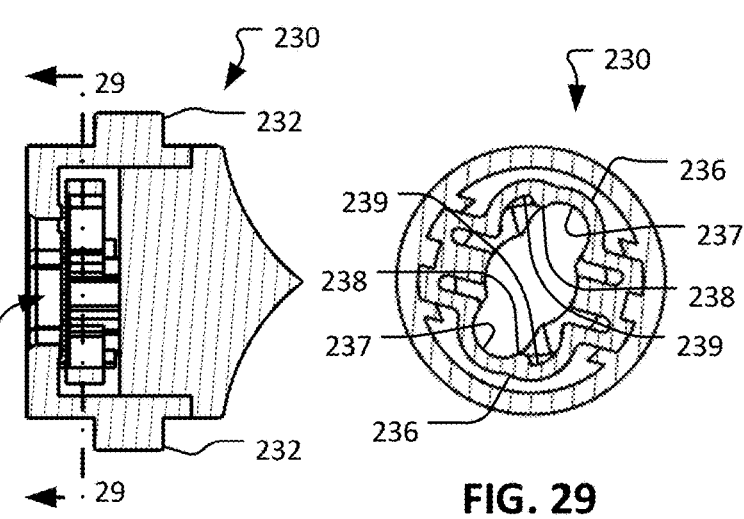

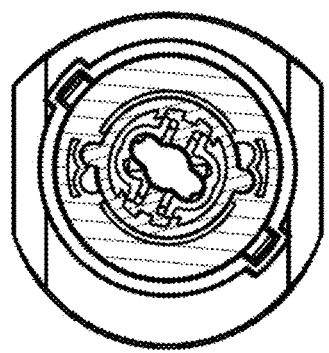
FIG. 35
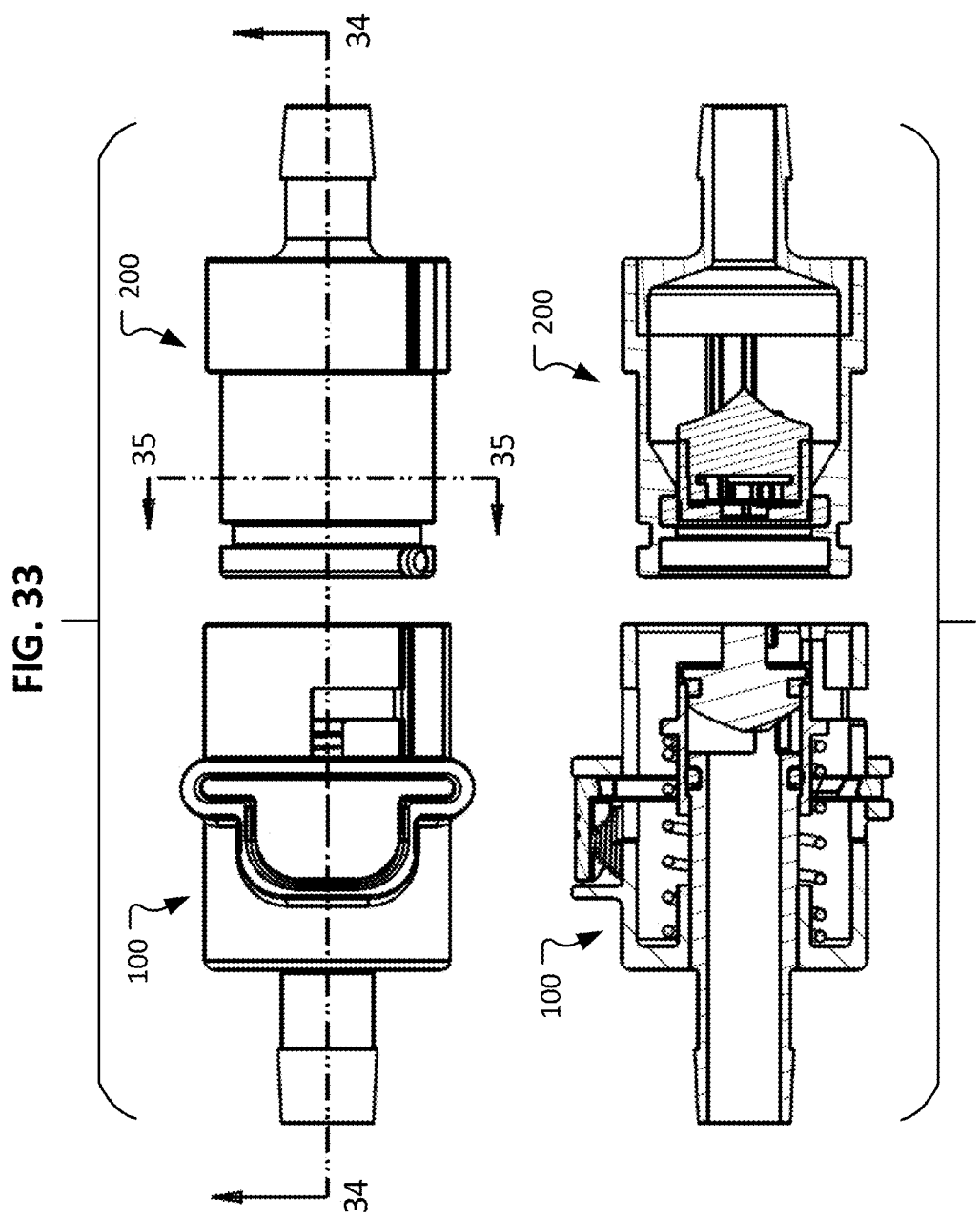
FIG. 33
FIG. 34

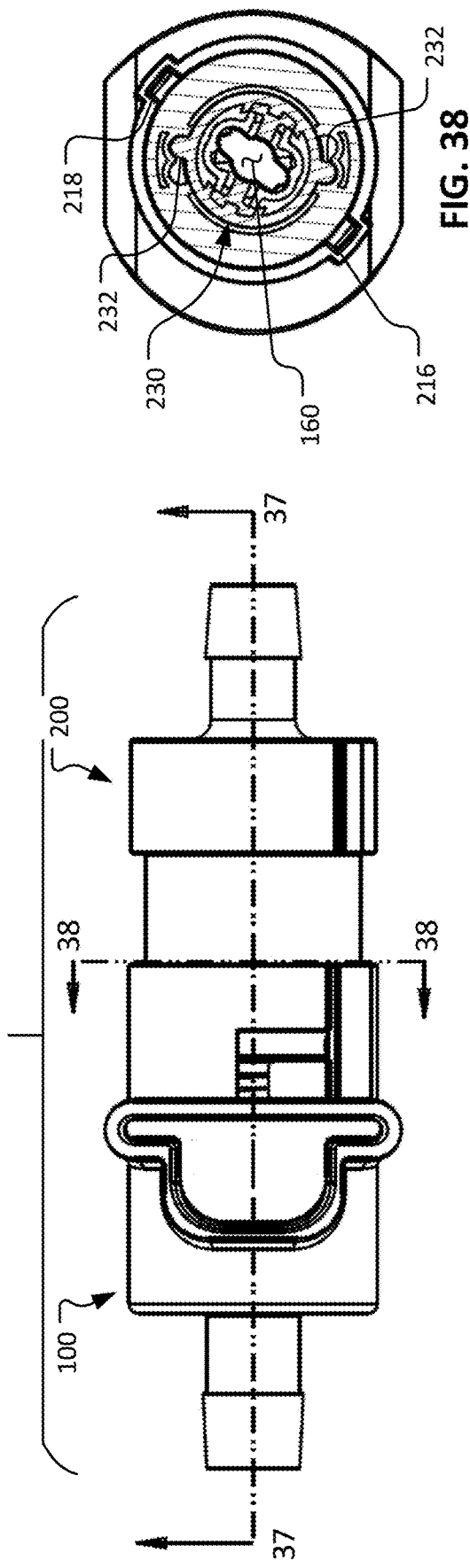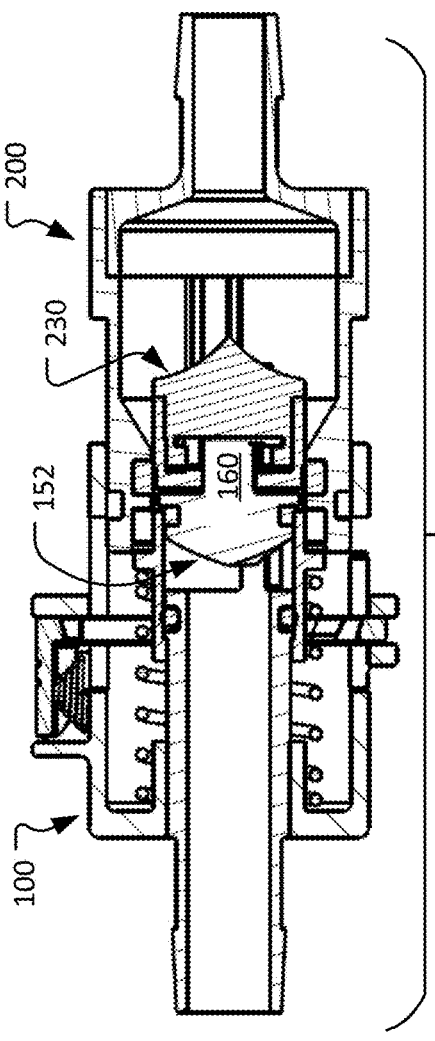

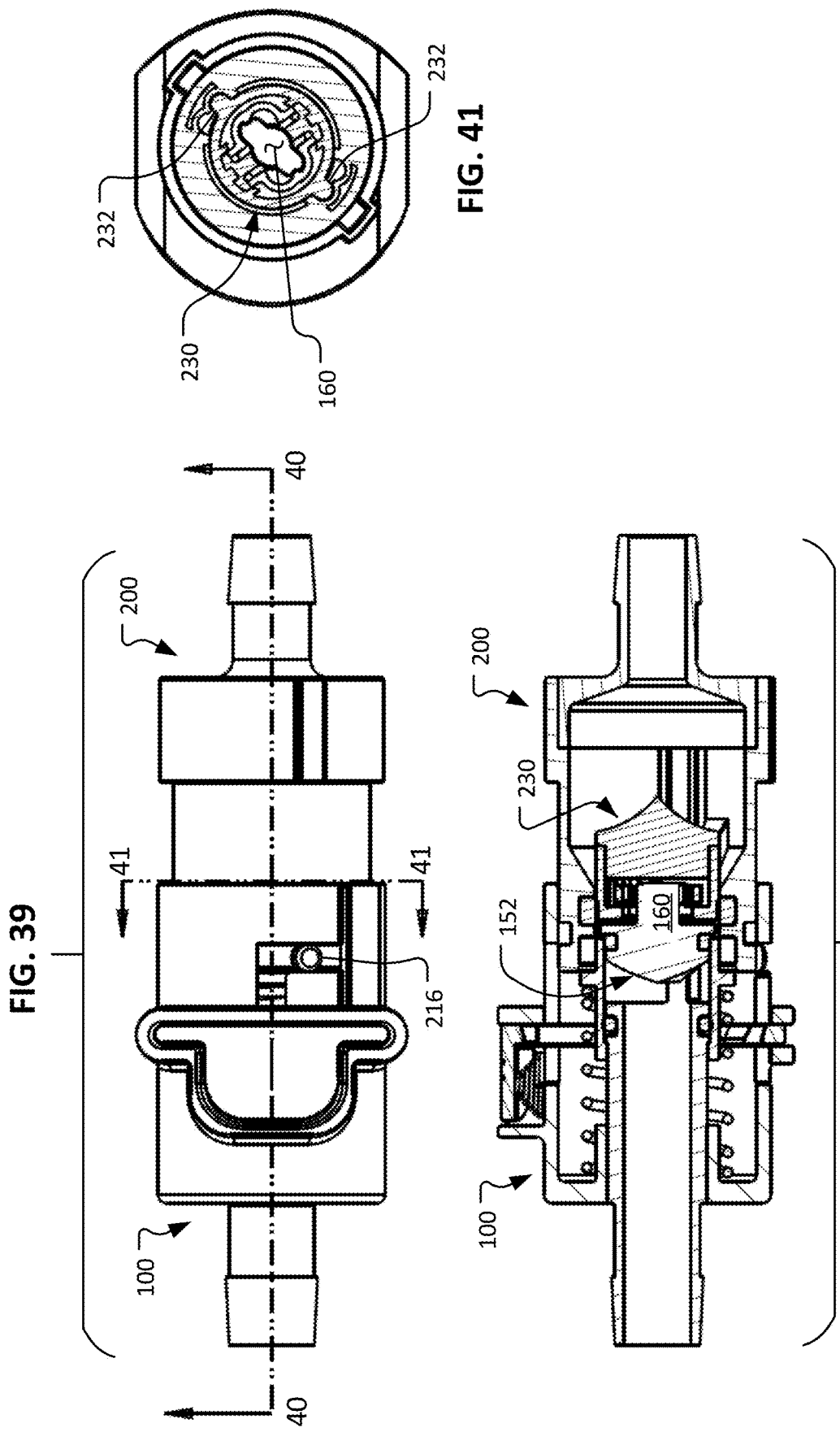

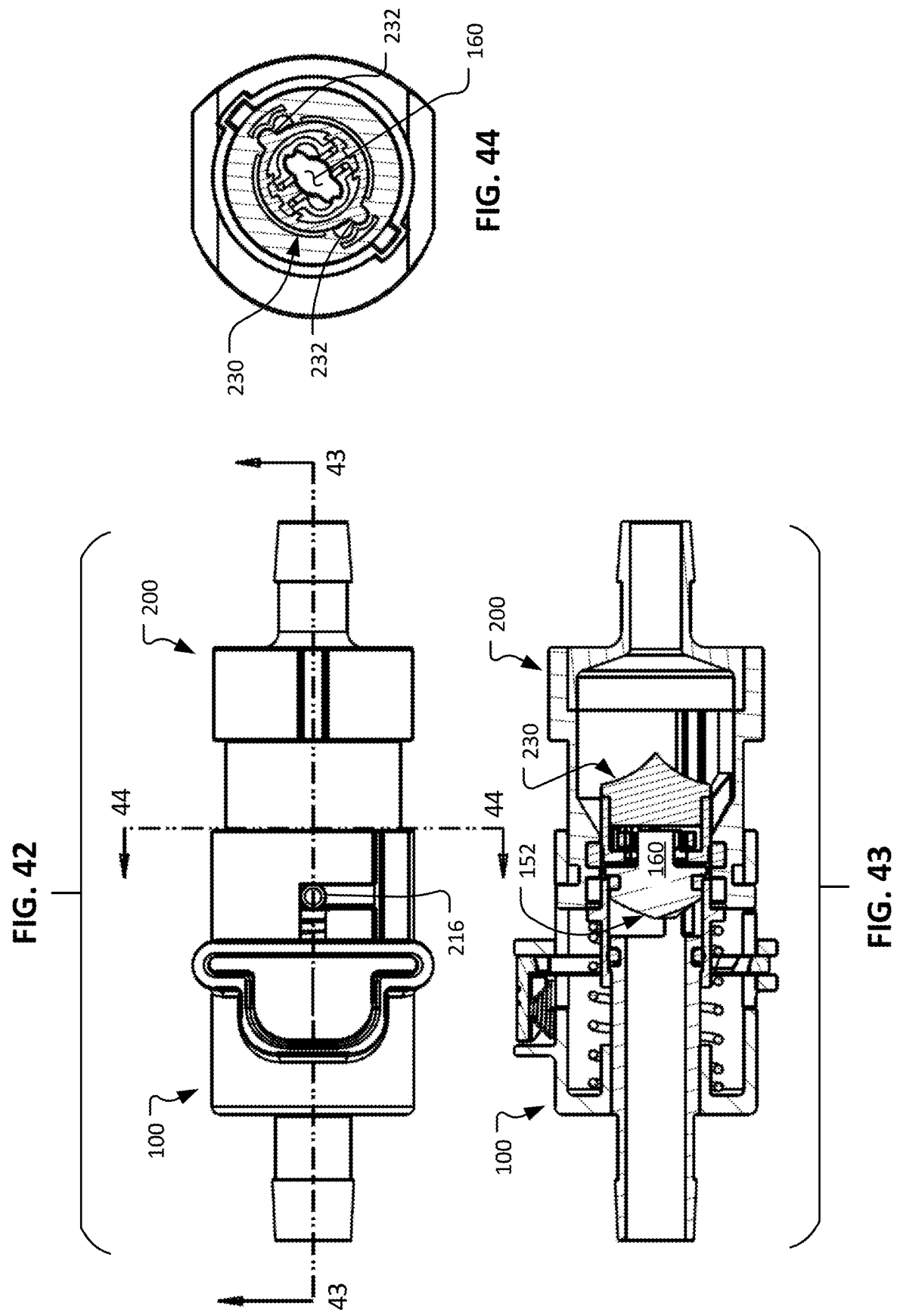

FLUID HANDLING COUPLINGS

CROSS-REFERENCE TO RELATED APPLICATIONS

This is a continuation application of U.S. patent application Ser. No. 17/617,809 filed on Dec. 9, 2021, now U.S. Pat. No. 12,038,113, which is a National Stage application under 35 U.S.C. § 371 of International Application No. PCT/US2020/036588, having an International Filing Date of Jun. 8, 2020, which claims the benefit U.S. Provisional Application Ser. No. 62/859,558, filed Jun. 10, 2019. The disclosure of the prior applications are considered part of (and are incorporated by reference in) the disclosure of this application.

TECHNICAL FIELD

This document relates to fluid handling couplings. For example, this document relates to fluid couplings that are designed to prevent spillage of fluid when disconnecting the couplings after use.

BACKGROUND

Fluid handling components such as fluid couplings allow fluid communication between two or more components. Some fluid couplings include features that allow male and female components to be quickly connected or disconnected, and may include one or more internal valve components that selectively block or allow flow of fluid through the coupling.

SUMMARY

This document describes fluid handling couplings. For example, this document describes fluid couplings that are designed to prevent spillage of fluid when disconnecting the couplings after use. In some embodiments, the fluid couplings described herein include internal valve components but no springs, or no springs in the fluid flow path. In some embodiments, the internal valve components of a male coupling and a female coupling can be designed to latch together in an abutted arrangement. By latching the valve components together, the tendency for fluid to spill when disconnecting the fluid couplings after use can be mitigated, and the necessity to use springs to operate the valve components can be reduced or eliminated.

In one aspect, this disclosure is directed to a fluid coupling system that includes a male coupling and a female coupling. The male coupling includes a male coupling body defining a male longitudinal axis and a male coupling internal space. The male coupling also includes a male valve member disposed within the male coupling internal space. The male valve member is movable, along the male longitudinal axis, relative to the male coupling body to open and close a flow path through the male coupling. The female coupling includes a female coupling body defining a female longitudinal axis and a female coupling internal space. The female coupling also includes a valve assembly disposed within the female coupling internal space that includes a valve stem head and a valve sleeve. The valve sleeve is movable, along the female longitudinal axis, relative to the female coupling body and the valve stem head to open and close a flow path through the female coupling. The valve stem head and the male valve member include complementary structures to latch them together in an abutted arrangement.

Such a fluid coupling system may optionally include one or more of the following features. The complementary structures may include: (i) a projection extending from a front face of the valve stem head; and (ii) a recess defined by a front face of the male valve member. The recess can be shaped to receive the projection. In some embodiments, the projection is a T-shaped projection. The front faces of the valve stem head and the male valve member may be pressed against each other while the valve stem head and the male valve member are in the abutted arrangement. The fluid coupling system may also include an elastomeric first seal attached to either the valve stem head or the male valve member such that the first seal is compressed therebetween while the valve stem head and the male valve member are in the abutted arrangement. The first seal may be attached to the valve stem head, and/or the first seal may be disposed between the valve stem head and the valve sleeve while the flow path is closed through the female coupling. The female coupling may include a spring arranged to bias the valve sleeve against the valve stem head to close the flow path through the female coupling. In some embodiments, the male coupling is spring-less. The male valve member may be rotatable, about the male longitudinal axis, relative to the male coupling body between a first position and a second position. The male valve member may be movable along the male longitudinal axis while the male valve member is in the second position. The male valve member may be prevented from moving along the male longitudinal axis while the male valve member is in the first position.

In another aspect, this disclosure is directed to a female coupling that includes: (a) a coupling body defining a longitudinal axis and an internal space; (b) a valve assembly disposed within the internal space and comprising a valve stem head and a valve sleeve (the valve sleeve may be movable, along the longitudinal axis, relative to the coupling body and the valve stem head to open and close a flow path through the female coupling); (c) a spring arranged to bias the valve sleeve against a seal member attached to the valve stem head to close the flow path through the female coupling; and (d) a mechanism coupled to the coupling body and configured to latch a mated male coupling to the female coupling. The mechanism may be movable between a latched arrangement and an unlatched arrangement. The valve stem head may include a protuberance or projection extending from a front face of the valve stem head along the longitudinal axis.

Such a female coupling may optionally include one or more of the following features. In some embodiments, the protuberance is T-shaped. Such a T-shaped protuberance may include two arms extending in opposite directions transverse to the longitudinal axis. In some embodiments, at least one arm of the two arms defines a notch in an outer profile of the at least one arm. In particular embodiments, each arm defines a notch in its outer profile. The seal member may be disposed on the front face of the valve stem head. The protuberance may extend through an opening in the seal member.

In another aspect, this disclosure is directed to a male coupling. The male coupling includes: (i) a coupling body defining a longitudinal axis and an internal space; and (ii) a valve member disposed within the internal space. The valve member is movable, along the longitudinal axis, relative to the coupling body to open and close a flow path through the male coupling. A front face of the valve member may defines an opening to a recess. The valve member may be rotatable, about the longitudinal axis, relative to the coupling body between a first position and a second position.

Such a male coupling may optionally include one or more of the following features. The valve member may be movable along the longitudinal axis while the valve member is in the second position. The valve member may be prevented from moving along the longitudinal axis while the valve member is in the first position. The valve member may latch in the first position and/or may latch in the second position. In some embodiments, the male coupling is spring-less and includes no metal. In certain embodiments, the opening is oblong.

Some embodiments of the devices, systems and techniques described herein may provide one or more of the following advantages. First, the fluid couplings described herein are designed to prevent spillage or escape of fluid when disconnecting the couplings after use. By preventing spillage, material loss, soiling, contamination and costs associated with spillage may be reduced. Second, the fluid couplings described herein are designed to prevent the inclusion of air and/or other environmental substances into the fluid, as can often result during the process of joining male and female couplings together. By preventing air inclusion, the fluid is maintained in its most desired state. Third, in some embodiments the fluid couplings described herein include internal shut-off valves to prevent fluid spillage, but do not include any springs as are usually included in couplings with such shut-off valves. Springless couplings with valves can be advantageous because sometimes springs can cause fluid contamination, fluid flow restriction, chemical compatibility issues, and can preclude the use of some types of sterilization processes. In some embodiments of the fluid couplings described herein, a spring is included but is arranged such that the spring is advantageously located out of the fluid flow path. Fourth, the fluid couplings described herein are coupled together in a particular way that also advantageously latches together the valve components of the couplings. Fifth, the fluid couplings described herein are convenient to decouple from each other. For example, a latch component of the female coupling may simply be depressed and the male and female couplings can then be separated from each other. Sixth, the fluid couplings described herein are economical to manufacture. For example, in some embodiments the fluid couplings described herein are made entirely, or almost entirely, of injection molded thermoplastic components.

The details of one or more implementations are set forth in the accompanying drawings and the description below. Other features and advantages will be apparent from the description and drawings, and from the claims.

BRIEF DESCRIPTION OF DRAWINGS

The present description is further provided with reference to the appended Figures, wherein like structure is referred to by like numerals throughout the several views, and wherein:

FIG. 23 is a side view of the main body of FIG. 22.

FIG. 24 is a longitudinal cross-section view of the main body of FIG. 22, taken along the cutting plane 24-24 indicated in FIG. 23.

FIG. 25 is a transverse cross-section view of the main body of FIG. 22, taken along the cutting plane 25-25 indicated in FIG. 23.

FIG. 26 is a perspective view of a valve member of the male coupling of FIG. 1.

FIG. 27 is an end view of the valve member of FIG. 26.

FIG. 28 is a longitudinal cross-section of the valve member of FIG. 26, taken along the cutting plane 28-28 indicated in FIG. 27.

FIG. 29 is a transverse cross-section of the valve member of FIG. 26, taken along the cutting plane 29-29 indicated in FIG. 28.

FIG. 33 is a side view of the male and female couplings of FIG. 1 in the uncoupled arrangement.

FIG. 34 is a longitudinal cross-section view of the male and female couplings of FIG. 1, taken along the cutting plane 34-34 indicated in FIG. 33.

FIG. 35 is a transverse cross-section view of the male coupling of FIG. 1, taken along the cutting plane 35-35 indicated in FIG. 33.

FIG. 36 is a side view of the male and female couplings of FIG. 1 arranged after an initial partial longitudinal insertion.

FIG. 37 is a longitudinal cross-section view of the male and female couplings of FIG. 1, taken along the cutting plane 37-37 indicated in FIG. 36.

FIG. 38 is a transverse cross-section view of the male and female couplings of FIG. 1, taken along the cutting plane 38-38 indicated in FIG. 36.

FIG. 39 is a side view of the male and female couplings of FIG. 1 arranged after an initial partial rotation.

FIG. 40 is a longitudinal cross-section view of the male and female couplings of FIG. 1, taken along the cutting plane 40-40 indicated in FIG. 39.

FIG. 41 is a transverse cross-section view of the male and female couplings of FIG. 1, taken along the cutting plane 41-41 indicated in FIG. 39.

FIG. 42 is a side view of the male and female couplings of FIG. 1 arranged after a final rotation.

FIG. 43 is a longitudinal cross-section view of the male and female couplings of FIG. 1, taken along the cutting plane 43-43 indicated in FIG. 42.

FIG. 44 is a transverse cross-section view of the male and female couplings of FIG. 1, taken along the cutting plane 44-44 indicated in FIG. 42.

DETAILED DESCRIPTION OF ILLUSTRATIVE EMBODIMENTS

This document describes fluid handling couplings. For example, this document describes fluid couplings that are designed to prevent spillage of fluid when disconnecting the couplings after use. In some embodiments, the fluid couplings described herein include internal valve components but no springs, or no springs in the fluid flow path. In some embodiments, the internal valve components of a male coupling and a female coupling latch together in an abutted arrangement. By latching the valve components together, the tendency for fluid to spill when disconnecting the fluid couplings after use can be mitigated, and the necessity to use springs to operate the valve components can be reduced or eliminated.

Figure 1:
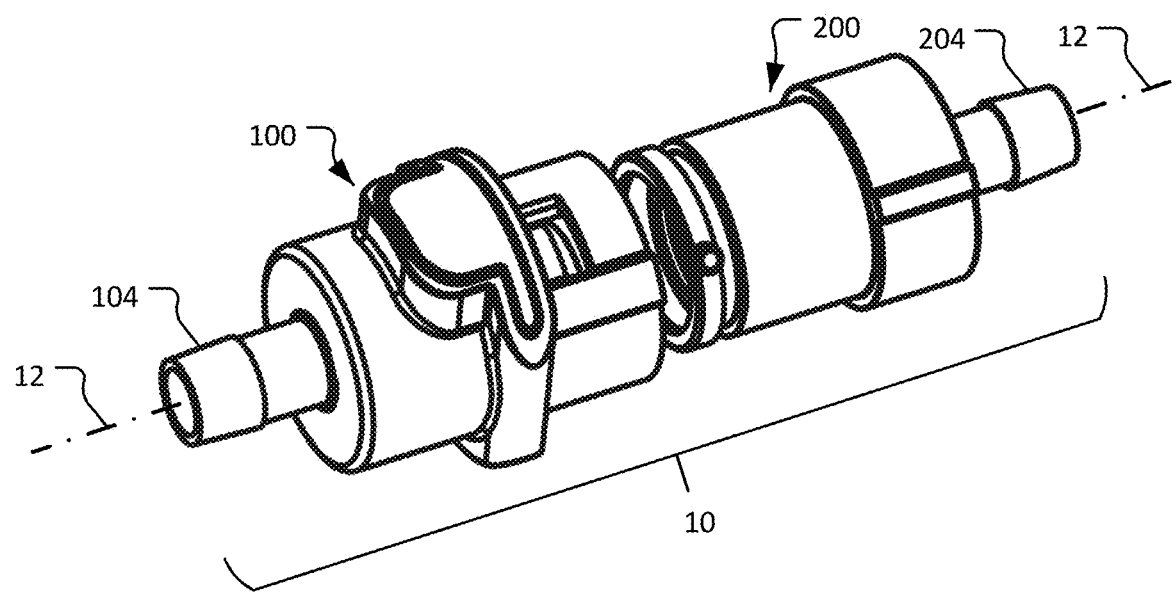
FIG. 1 is perspective view of a male fluid coupling and a female fluid coupling in an uncoupled arrangement.

FIG. 1 provides a view of a fluid coupling system 10 in an uncoupled arrangement. The fluid coupling system 10 includes a female coupling 100 and a male coupling 200. The female coupling 100 and the male coupling 200 can be connected to establish a fluid flow path extending between a female coupling termination 104 and a male coupling termination 204, and disconnected (as shown) to close the fluid flow path. Hence, the female coupling 100 and the male coupling 200 are releasably coupleable.

The fluid coupling system 10 is a non-spill coupling system. That is, as described further below, the coupling system 10 is designed so that no fluid will spill (or only a minimal amount of fluid will spill) from the female coupling 100 and the male coupling 200 when they are disconnected from each other after use.

To connect or couple the female coupling 100 and the male coupling 200, they are each first coaxially aligned with an insertion axis 12. That is, the longitudinal axes of the female coupling 100 and the male coupling 200 are arranged to coincide with the insertion axis 12. Then, as described further below, the connection process includes the following motions: (i) an initial partial longitudinal insertion, (ii) a relative rotation (which includes an initial portion and a final portion), and (iii) a final longitudinal insertion. In the fully coupled arrangement, the female coupling 100 and the male coupling 200 are mechanically latched or detained together.

Figure 2:
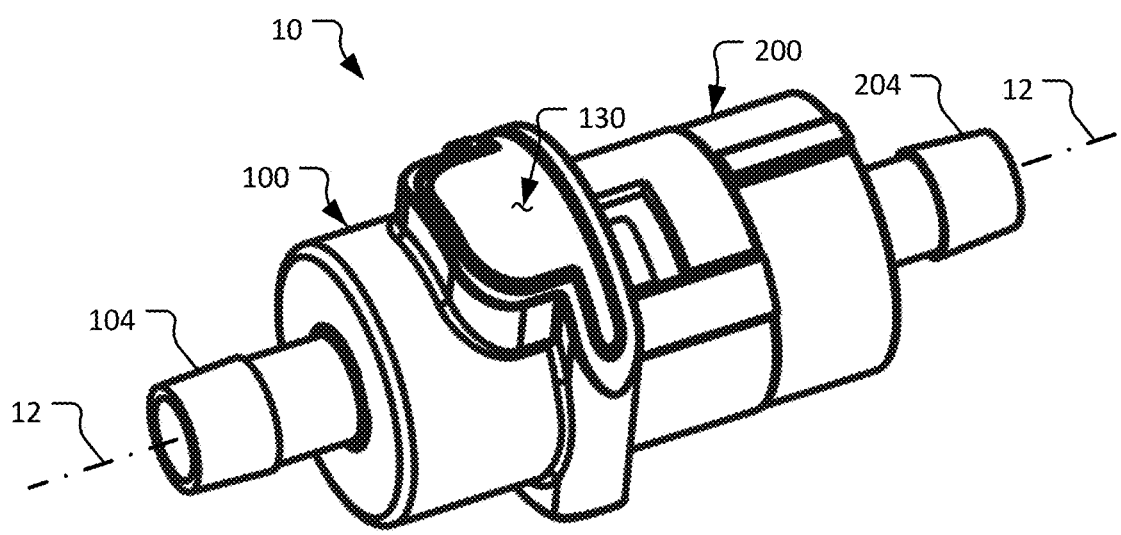
FIG. 2 is a perspective view of the male and female fluid couplings of FIG. 1 in a coupled arrangement.

FIG. 2 depicts the fluid coupling system 10 in the fully coupled arrangement. In this fully coupled arrangement, fluid can flow between the female coupling termination 104 and the male coupling termination 204 (along an open fluid flow path through the fluid coupling system 10). As described further below, the female coupling 100 and the male coupling 200 each include an internal valve that is open while the fluid coupling system 10 in the fully coupled arrangement, and closed while the fluid coupling system 10 in the uncoupled arrangement (FIG. 1). The process of connecting the female coupling 100 and the male coupling 200 causes the internal valves to open. Inversely, the process of disconnecting the female coupling 100 and the male coupling 200 causes (or allows) the internal valves to close. With the internal valves closed, fluid is shut off from being able to flow out of either/both of the female coupling 100 or the male coupling 200.

While the coupling terminations 104 and 204 are depicted as barbed fittings, any type of fluid connection can be used. For example, the coupling terminations 104 and/or 204 can be, but not limited to, a compression fitting, a press-in fitting, a luer fitting, a threaded fitting (internal or external), a sanitary fitting, a pigtail, a T-fitting, a Y-fitting, and any other suitable type of configuration such that the female coupling 100 and male coupling 200 are compatible with, and configured for connection to, any type of fluid system as desired. In some embodiments, the female coupling 100 and/or male coupling 200 may be supplied with a removable cap (not shown), or another type of component, that is releasably coupled with the terminations 104 and/or 204. In some embodiments, the female coupling 100 and/or male coupling 200 may be provided as sterile coupling members.

The materials from which one or more of the components of the female coupling 100 and/or male coupling 200 are made of include thermoplastics. In particular embodiments, the materials from which the components of the female coupling 100 and/or male coupling 200 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the materials from which one or more of the components of the female coupling 100 and/or male coupling 200 are made of include metals such as, but not limited to stainless steel, brass, aluminum, plated steel, and the like. In particular embodiments, the female coupling 100 and/or male coupling 200 is/are metallic-free. In some embodiments, the female coupling 100 and/or male coupling 200 include one or more metallic spring members (e.g., spring steel, stainless steel, and the like). In certain embodiments, female coupling 100 and/or male coupling 200 include one or more seals that are made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like.

In the fully coupled arrangement as shown, the female coupling 100 and the male coupling 200 are mechanically latched or detained together. In order to uncouple the female coupling 100 and the male coupling 200, first a latch member 130 is manually depressed (transversely to the insertion axis 12). Depressing the latch member 130 will release the mechanical detainment between the female coupling 100 and the male coupling 200. Then the female coupling 100 and the male coupling 200 can be disconnected or separated from each other (uncoupled). As described further below, the process of disconnecting the female coupling 100 and the male coupling 200 includes both longitudinal and relative rotational motions.

Figure 3:
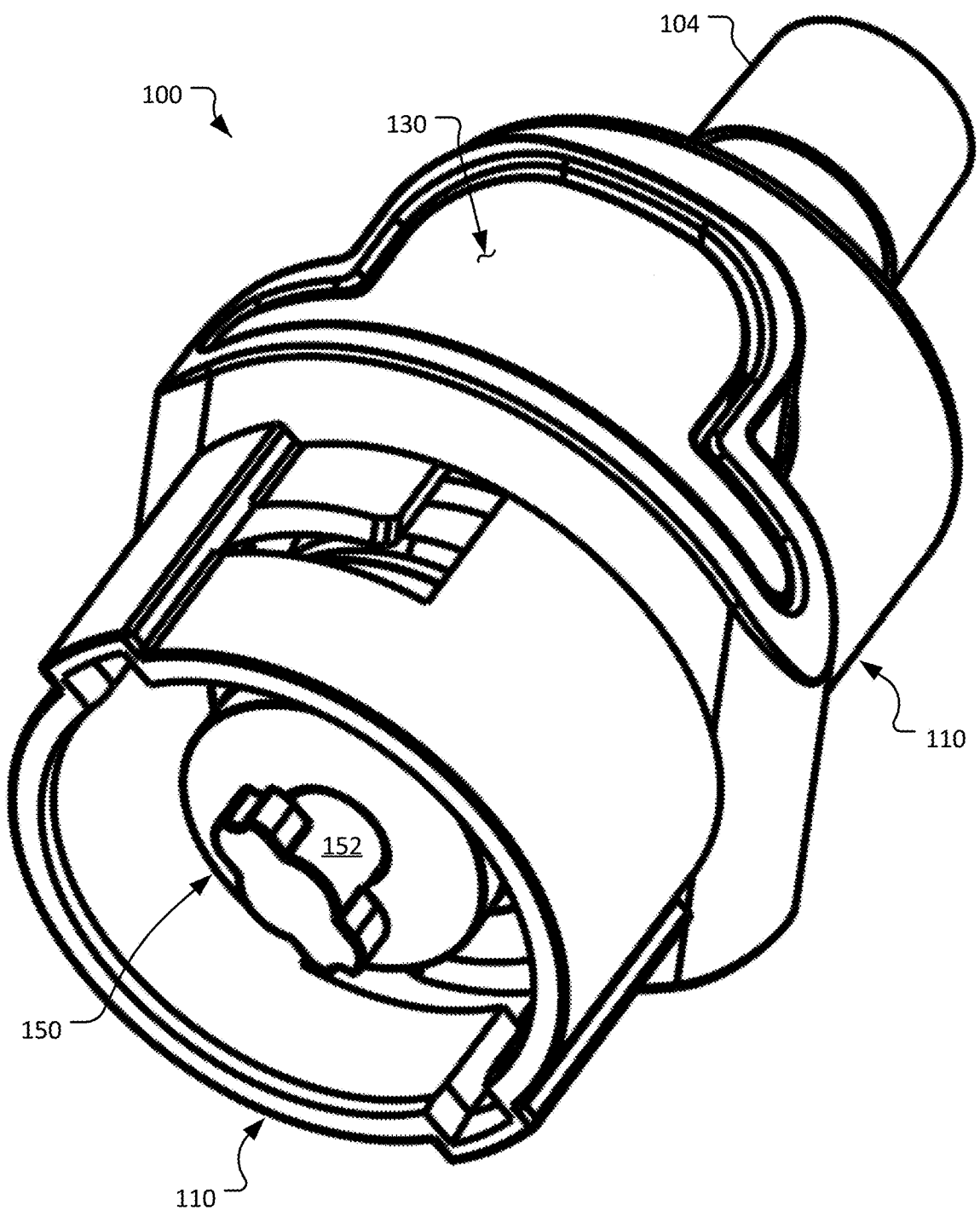
FIG. 3 is a perspective view of the female coupling of FIG. 1.
Figure 4:
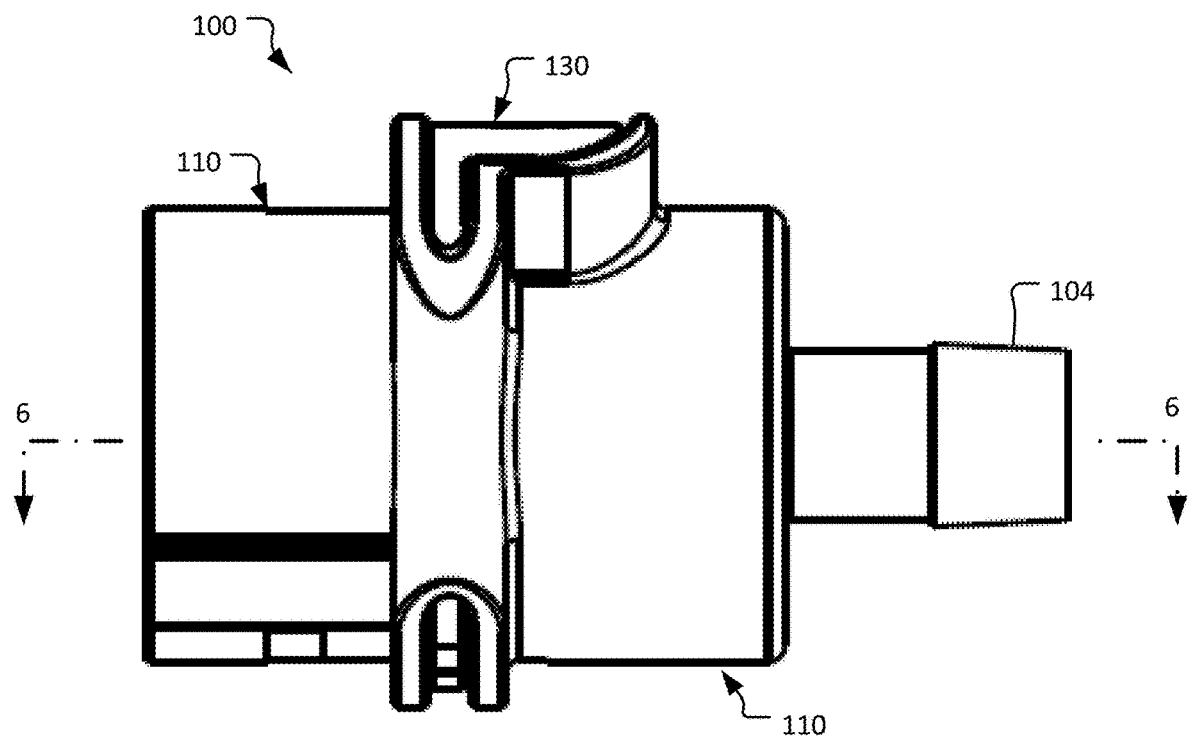
FIG. 4 is a side view of the female coupling of FIG. 1.

FIGS. 3 and 4 show external views of the female coupling 100 in greater detail. The female coupling 100 includes a female coupling body 110, the latch member 130, and a valve stem 150. The valve stem 150 includes a valve stem head 152 (which is partially visible). The valve stem 150 is in a fixed relationship with the female coupling body 110. The latch member 130 is movably coupled to the female coupling body 110.

Figure 5:
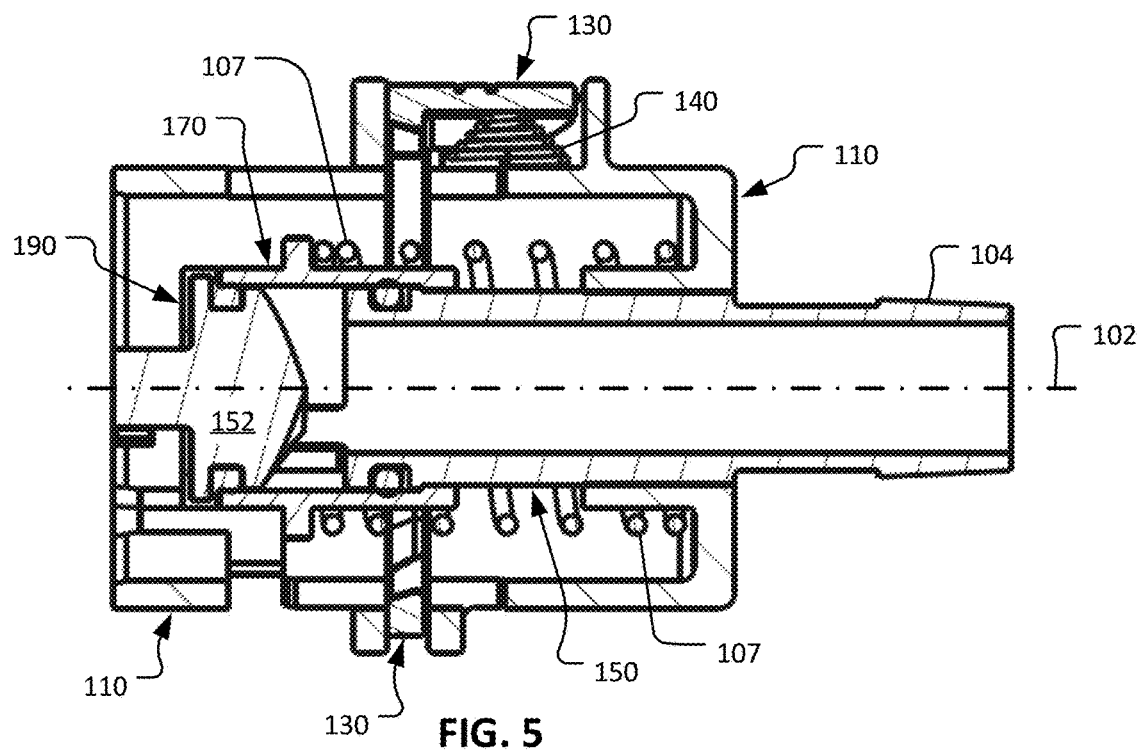
FIG. 5 is a first longitudinal cross-section view the female coupling of FIG. 1.

In FIG. 5, a longitudinal cross-sectional view of the female coupling 100 is provided so that additional internal components are visible. The female coupling 100 has a longitudinal axis 102. As shown, the female coupling 100 includes the valve stem 150, a valve spring 107, a valve sleeve 170, and a seal member 190. The valve spring 107 and the valve sleeve 170 are located concentrically around the valve stem 150. The valve sleeve 170 is longitudinally translatable in relation to the valve stem 150. The seal member 190 is fixedly coupled to the valve stem 150, and its compliant material interfaces with the valve stem 150 and the valve sleeve 170.

The female coupling 100 also includes a latch spring 140 disposed between the coupling body 110 and the latch member 130. The latch spring 140 is a compressible biasing member that biases the latch member 130 toward its latched position (as shown). Manually depressing the latch member 130 transversely translates the latch member 130 in relation to the central longitudinal axis 102 to move it to its unlatched position.

Figure 6:
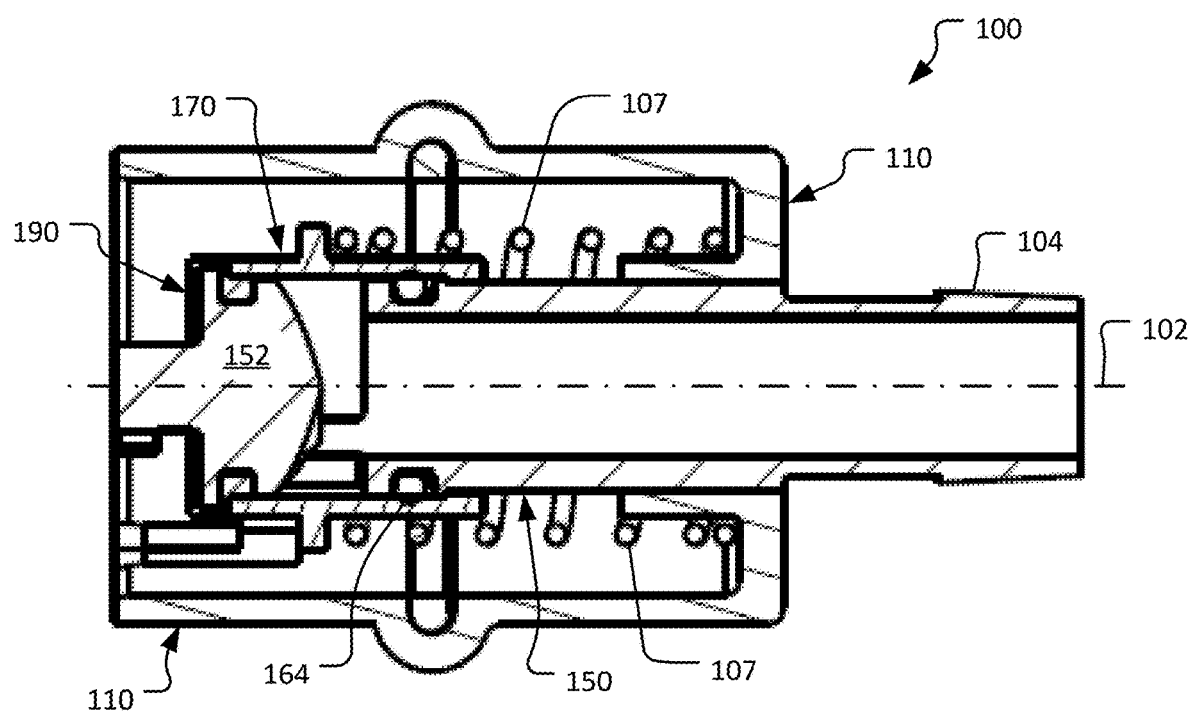
FIG. 6 is second longitudinal cross-section view the female coupling of FIG. 1, taken along the cutting plane 6-6 indicated in FIG. 4.
Figure 7:
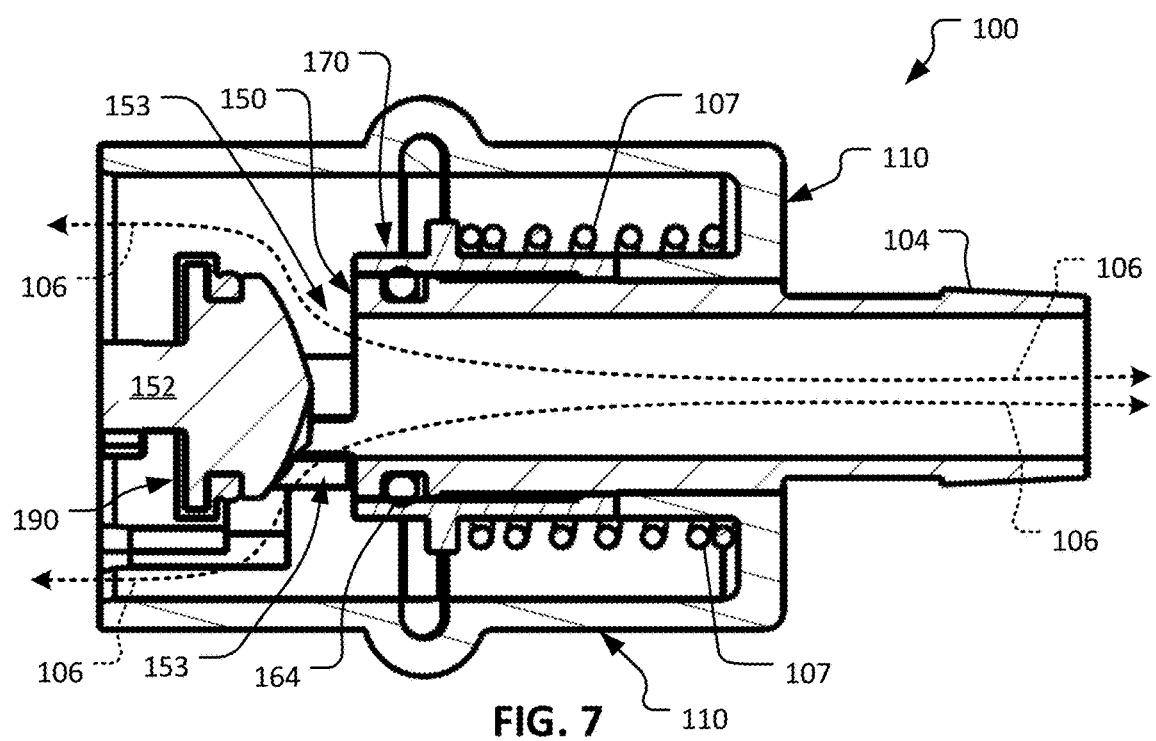
FIG. 7 shows the same longitudinal cross-section view as FIG. 6, but with the internal valve open to establish a fluid flow path through the female coupling.

FIGS. 6 and 7 are additional longitudinal cross-sectional views of the female coupling 100. These views are both taken along the cutting-plane 6-6 indicated in FIG. 4. In FIG. 6, the internal valve of the female coupling 100 is closed. That is, the valve sleeve 170 is in sealed contact with the seal member 190 to block fluid from flowing through the female coupling 100. In FIG. 7, the internal valve of the female coupling 100 is open to allow fluid flow through the female coupling 100 along a fluid flow path 106 (which can flow in either left-to-right or right-to-left). That is, the valve sleeve 170 is moved longitudinally away from the seal member 190 against resistance of the valve spring 107 (which is seated against the coupling body 110). As described further below, the process of coupling the female coupling 100 to the male coupling 200 actually provides the force to move the valve sleeve 170 longitudinally from its closed position (FIG. 6) to its open position (FIG. 7).

The seal member 190 is affixed to the valve stem head 152. The seal member 190 provides multiple compliant sealing regions. For example, as shown in FIG. 6, the valve sleeve 170 seals against the seal member 190 both around the circumference of the inner diameter of the valve sleeve 170 and around the annular face of the valve sleeve 170. In addition, the valve sleeve 170 extends onto the front face of the valve stem head 152 where it seals against the valve member of a mated male coupling 200, as described further below.

A second seal 164 is also disposed between the valve stem 150 and the valve sleeve 170 to provide a fluid seal therebetween. The second seal 164 is seated in a groove defined in the outer diameter of the valve stem 150 so that it stays longitudinally stationary as the valve sleeve 170 longitudinally translates in relation to the valve stem 150 between the open and closed positions.

Figure 8:
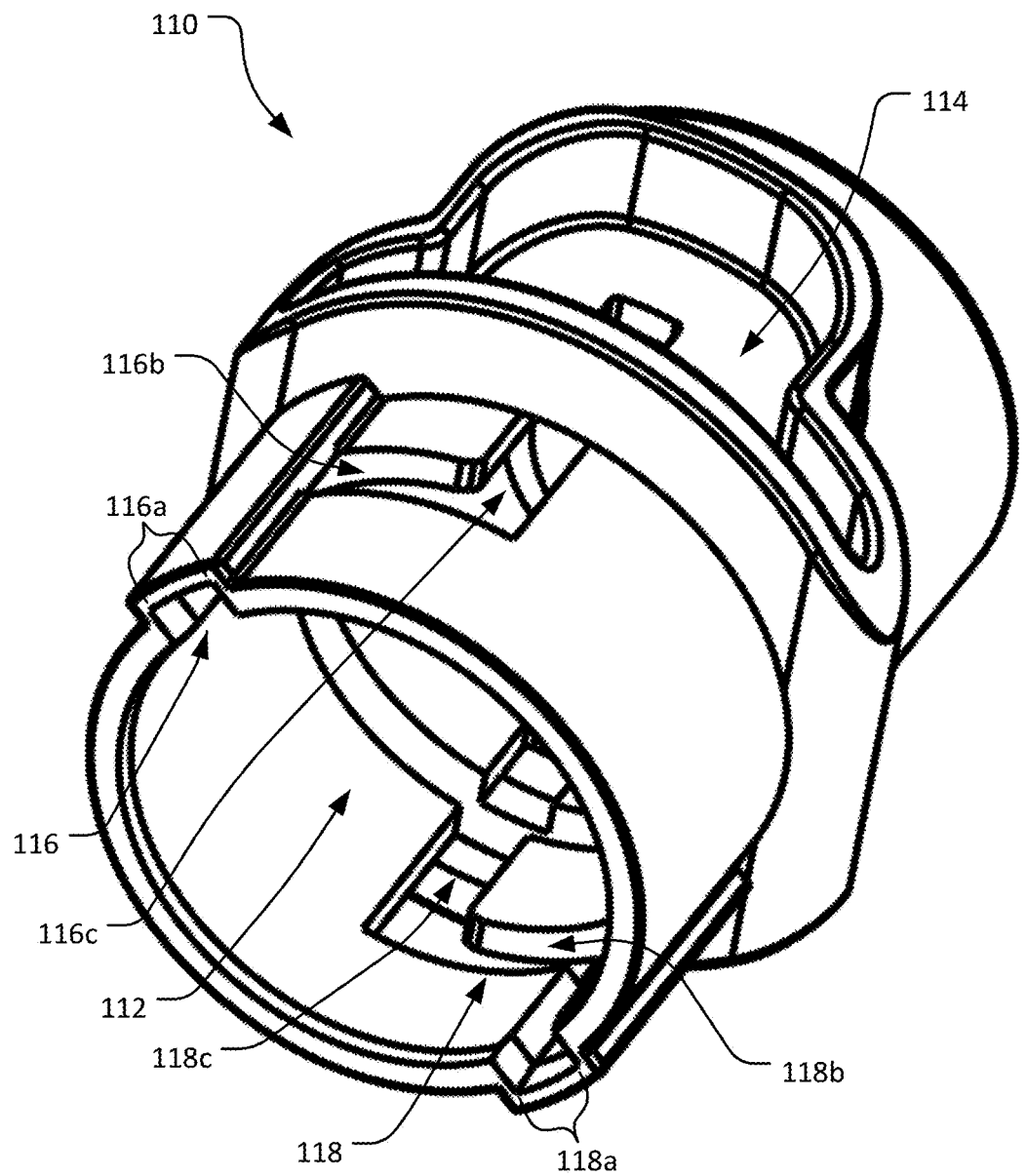
FIG. 8 is a perspective view of a main body of the female coupling of FIG. 1.

FIG. 8 shows the coupling body 110 in isolation from other components of the female coupling 100. The female coupling body 110 defines an internal space 112. The internal valve components of the female coupling 100 such as the valve stem 150, valve sleeve 170, valve spring 107, and seals 164 and 190 are disposed within the internal space 112 of the female coupling body 110.

The female coupling body 110 also defines structural features that complementarily configure the coupling body 110 to receive the shape and accommodate the operational movements of the latch member 130 (e.g., FIGS. 2-5 and 9). For example, the coupling body 110 defines a latch member recess and transverse slots 114.

The female coupling body 110 also defines structural features that complementarily configure the coupling body 110 to interface with the male coupling 200 in the coupled arrangement and during the coupling process. For example, the inner diameter of the coupling body 110 defines slots 116 and 118 that each receive a respective protrusion extending from the outer diameter of the male valve body of the male coupling 200 as described further below. The slots 116 and 118 are nonlinear. That is, the slot 116 includes a first portion 116a extending linearly parallel to the longitudinal axis 102 of the female coupling 100, a second arcuate portion 116b (or middle portion 116b) extending around the longitudinal axis 120, and a third portion 116c extending linearly parallel to the longitudinal axis 102. The middle portion 116b connects the first portion 116a and the third portion 116c. Accordingly, the slot 116 is a continuous slot. Analogously, the slot 118 includes a first portion 118a extending linearly parallel to the longitudinal axis 102 of the female coupling 100, a second arcuate portion 118b (or middle portion 118b) extending around the longitudinal axis 120, and a third portion 118c extending linearly parallel to the longitudinal axis 102. The middle portion 118b connects the first portion 118a and the third portion 118c. Accordingly, the slot 118 is a continuous slot.

The shape of the slots 116 and 118 define the relative motions that are used to couple and uncouple the female coupling 100 and the male coupling 200. Accordingly, coupling of the female coupling 100 and the male coupling 200 occurs by: (i) a first longitudinal insertion of the male coupling 200 into the female coupling 100, (ii) a relative rotation between the female coupling 100 and the male coupling 200, and (iii) a final longitudinal insertion of the male coupling 200 into the female coupling 100. Uncoupling of the female coupling 100 and the male coupling 200 is accomplished by performance of those actions in reverse order.

Figure 9:
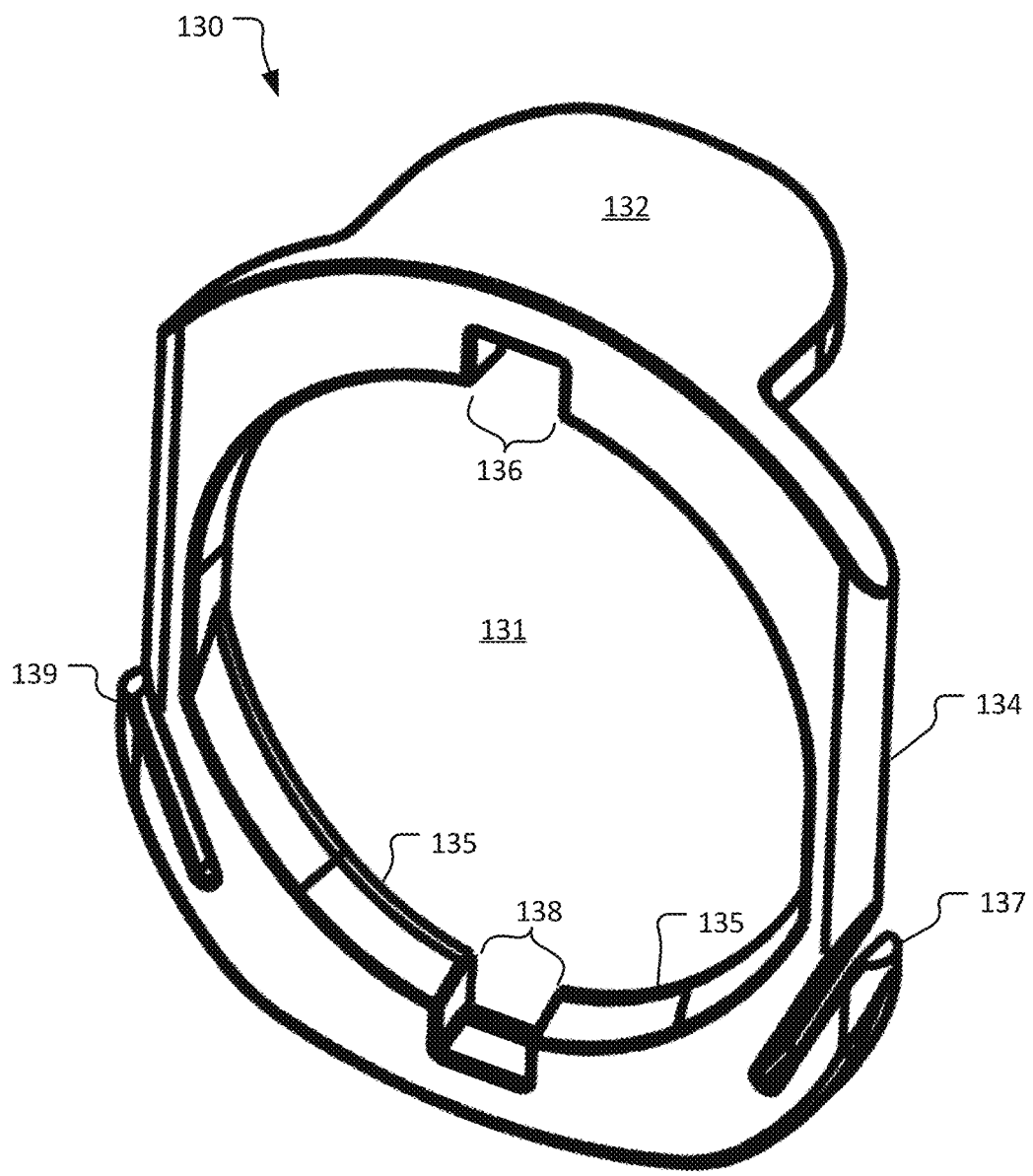
FIG. 9 is a perspective view of a clip member of the female coupling of FIG. 1.

FIG. 9 shows the latch member 130 in isolation from other components of the female coupling 100. The latch member 130 includes a tab 132 and a latch body 134. The latch body 134 defines an opening 131 through which the male coupling 200 extends while the female coupling 100 and the male coupling 200 are coupled together. The latch body 134 includes an engagement portion 135 opposite of the tab 132. The engagement portion 135 is a beveled surface that extends into a corresponding annular groove of the male coupling 200 while the female coupling 100 and the male coupling 200 are coupled together. The beveled surface allows the engagement process to take place by simply pushing the female coupling 100 and the male coupling 200 together longitudinally. That is, during the engagement process the male coupling 200 will force the latch member 130 to move transversely, and then the engagement portion 135 of the latch member 130 will snap into the annular groove of the male coupling 200 by virtue of the latch spring 140 when the male coupling 200 and the female coupling 100 are sufficiently longitudinally engaged with each other. The engagement between the engagement portion 135 and the corresponding annular groove of the male coupling 200 latches to detain the female coupling 100 and the male coupling 200 in the coupled arrangement (until the tab 132 is manually depressed).

The latch body 134 also defines a first groove 136 and a second groove 138 that make up portions of the opening 131. When the latch member 130 is assembled with the female coupling body 110, the first groove 136 aligns with the third portion 116c of the slot 116 of the female coupling body 110, and the second groove 138 aligns with the third portion 118c of the slop 118 of the female coupling body 110. Accordingly, the protrusions extending from the outer diameter of the male valve body of the male coupling 200 that are slidingly received in the slots 116 and 118 also pass through the first groove 136 and the second groove 138 of the latch body 134 during the process of coupling the female coupling 100 and the male coupling 200.

The latch body 134 also includes a first flexible barb 137 and a second flexible barb 139. When the latch member 130 is assembled with the female coupling body 110, the barbs 137 and 139 abut the female coupling body 110 to retain the latch member 130 in the assembled orientation against the force exerted by the latch spring 140. The flexibility of the barbs 137 and 139 facilitate convenient assembly of the latch member 130 to the female coupling body 110.

Figure 10:
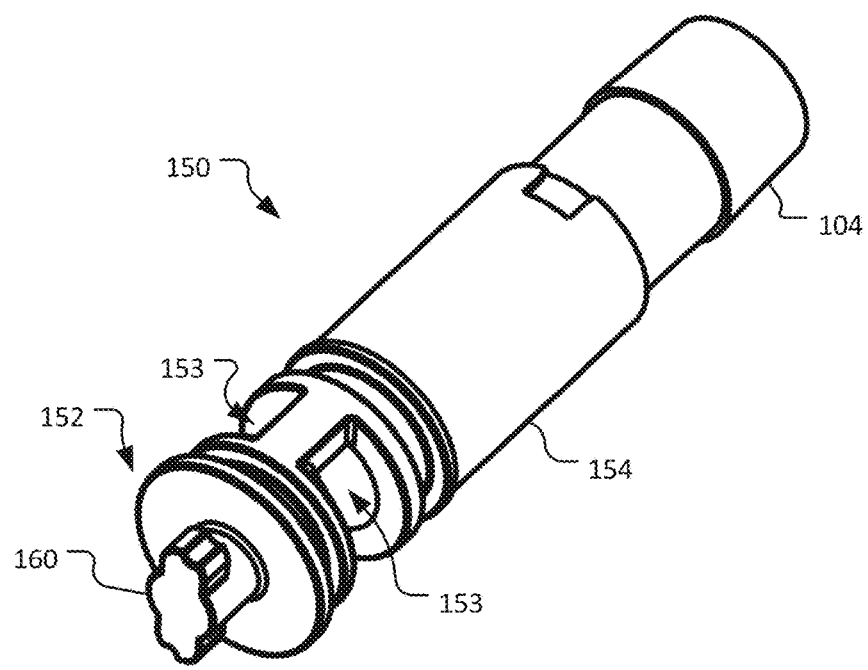
FIG. 10 is a perspective view of a valve stem of the female coupling of FIG. 1.
Figure 11:
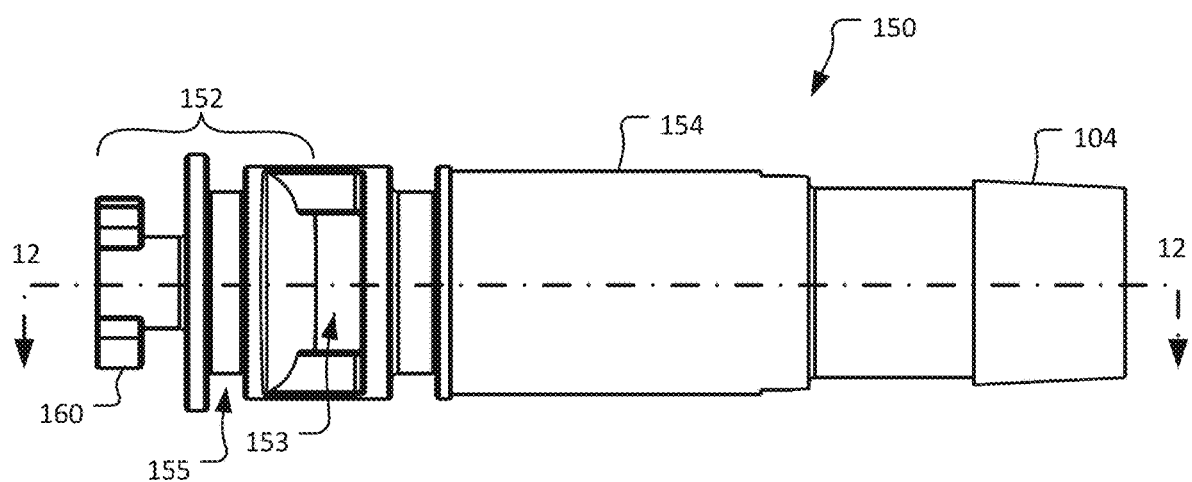
FIG. 11 is a side view of the valve stem of FIG. 10.
Figure 12:
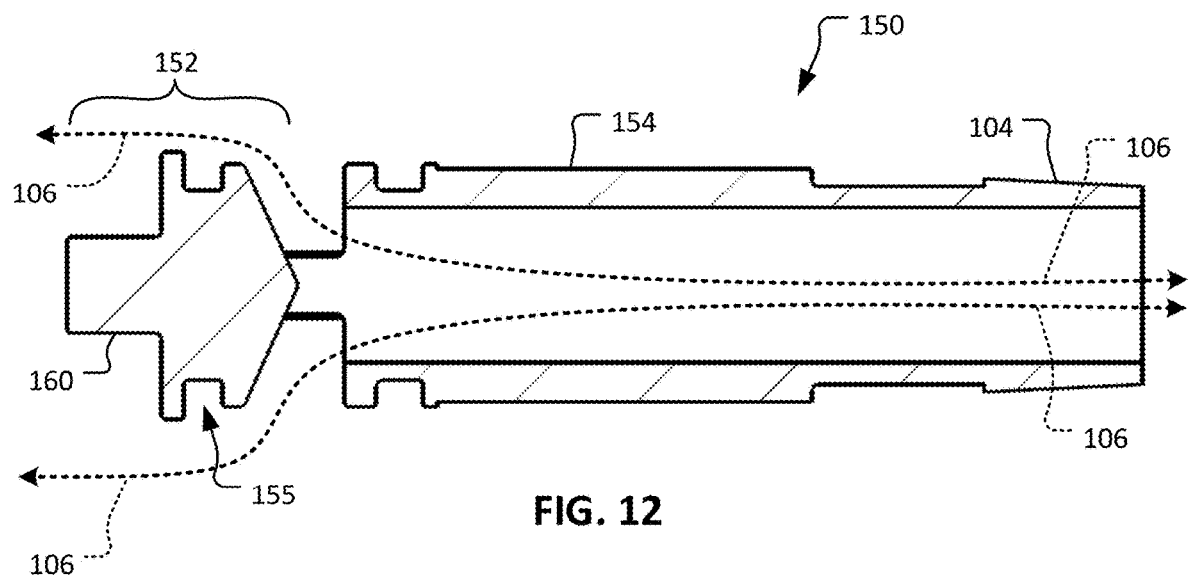
FIG. 12 is a longitudinal cross-section view of the valve stem of FIG. 10, taken along the cutting plane 12-12 indicated in FIG. 11.
Figure 13:
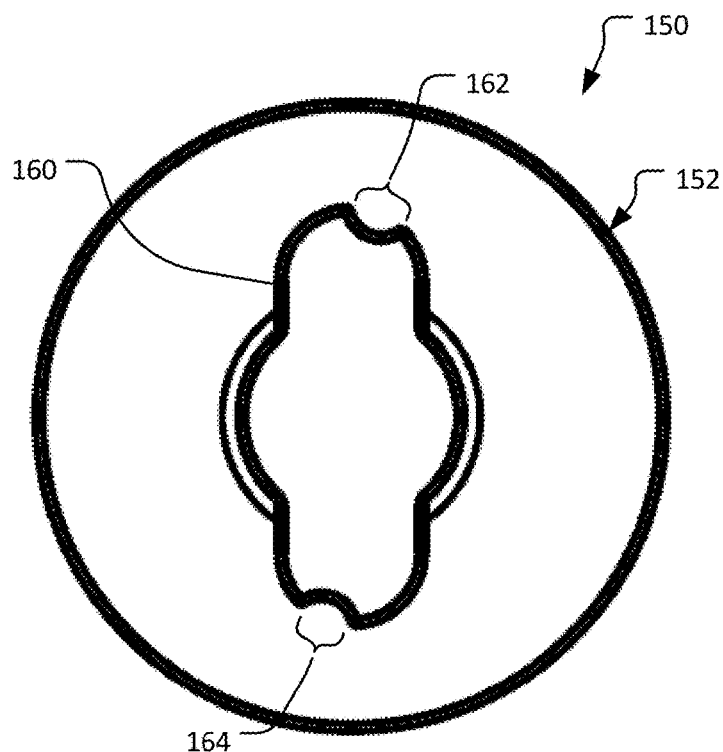
FIG. 13 is an end view of the valve stem of FIG. 10.

FIGS. 10-12 show the valve stem 150 in isolation from other components of the female coupling 100. The valve stem 150 includes the valve stem head 152 that is connected to a valve stem barrel 154. The female coupling termination 104 extends from the valve stem barrel 154. The fluid flow path 106 (FIG. 7) extends along the open inner space defined within the valve stem barrel 154 and the female coupling termination 104. One or more openings 153 are defined between the valve stem head 152 and the valve stem barrel 154. The one or more openings 153 are positioned along the fluid flow path 106 (FIGS. 7 and 12) and allow passage of fluid into or out of the open inner space defined within the valve stem barrel 154 and the female coupling termination 104.

The valve stem head 152 includes a projection 160 (or protuberance 160). The projection 160 extends longitudinally from the valve stem 150 and is T-shaped. As described further below, the projection 160 is sized and shaped to releasably engage with a corresponding recess defined in the male valve member of the male coupling 200 to latch the valve stem head 152 to the male valve member.

The laterally extending arms of the T-shaped projection 160 define notches 162 and 164. As described further below, the notches 162 and 164 mechanically interact with corresponding structures within the recess defined in the male valve member of the male coupling 200 to control the sequence of certain interactions between the female coupling 100 and the male coupling 200 during the relative rotational portion of the coupling process.

Figure 14:
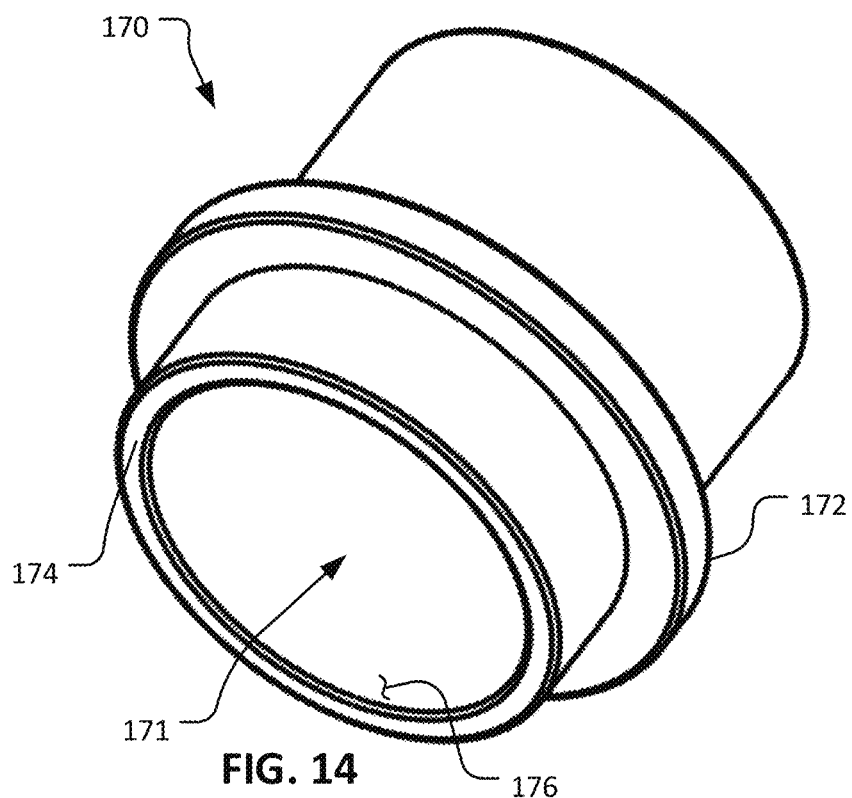
FIG. 14 is a perspective view of a valve sleeve of the female coupling of FIG. 1.
Figure 15:
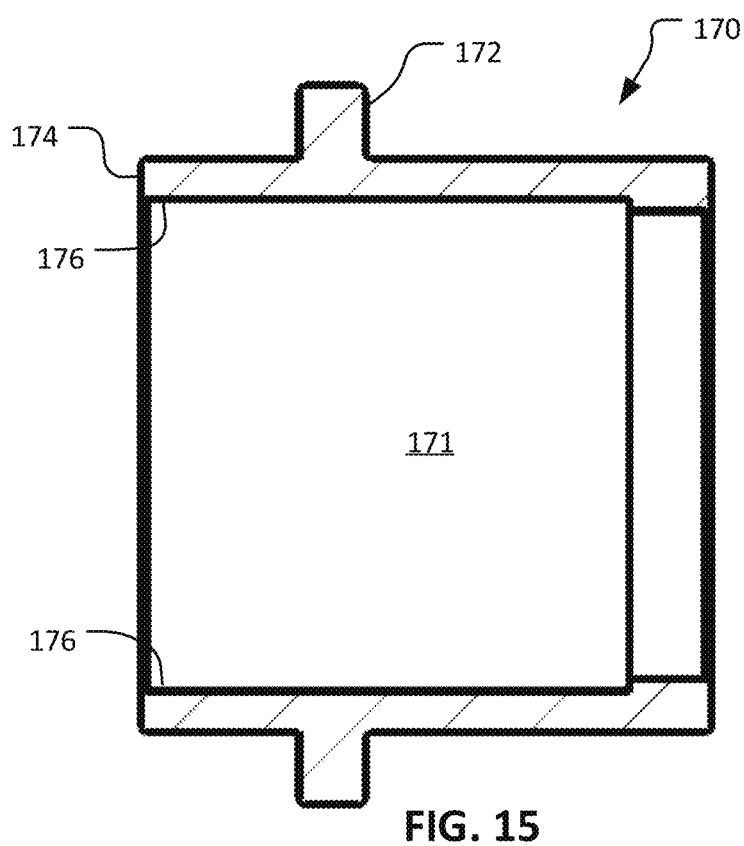
FIG. 15 is a longitudinal cross-section view of the valve sleeve of FIG. 14.

FIGS. 14 and 15 show the valve sleeve 170 in isolation from other components of the female coupling 100. The valve sleeve 170 defines an open inner space 171 in which the valve stem 150 is slidingly received. The valve sleeve 170 includes a radially-projecting annular shoulder 172 that the valve spring 107 abuts against to bias the valve sleeve 170 toward the closed position (FIGS. 5 and 6). The valve sleeve front face 174 abuts against the seal member 190 while the valve sleeve 170 is in the closed position. The front end portion of the inner annular wall 176 also contacts the seal member 190 while the valve sleeve 170 is in the closed position.

Figure 16:
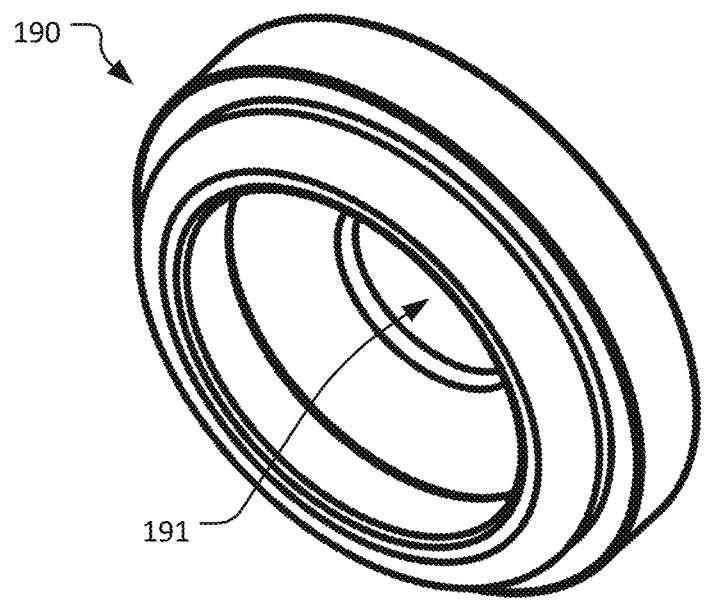
FIG. 16 is a perspective view of a seal of the female coupling of FIG. 1.
Figure 17:
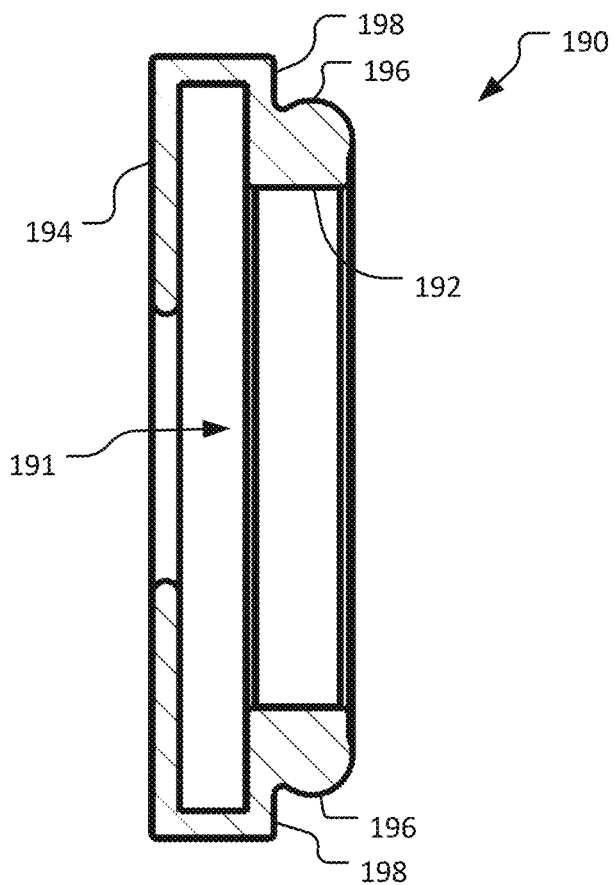
FIG. 17 is a longitudinal cross-section view of the seal of FIG. 16.

FIGS. 16 and 17 show the seal member 190 in isolation from other components of the female coupling 100. The compliant seal member 190 is configured to affix to (or be molded onto) the valve stem head 152. The seal member 190 includes an engagement portion 192 that seats within an annular groove 155 of the valve stem head 152 (FIGS. 11 and 12). The seal member 190 extends over the outer diameter of the valve stem head 152, and extends to a front face seal 194 that covers a portion of the front face of the valve stem head 152. The seal member 190 also includes seal portions 196 and 198 that seal against the inner annular wall 176 and the valve sleeve front face 174 of the valve sleeve 170, respectively, while the valve sleeve 170 is in the closed position. The projection 160 extends through an open center 191 of the seal member 190.

Figure 18:
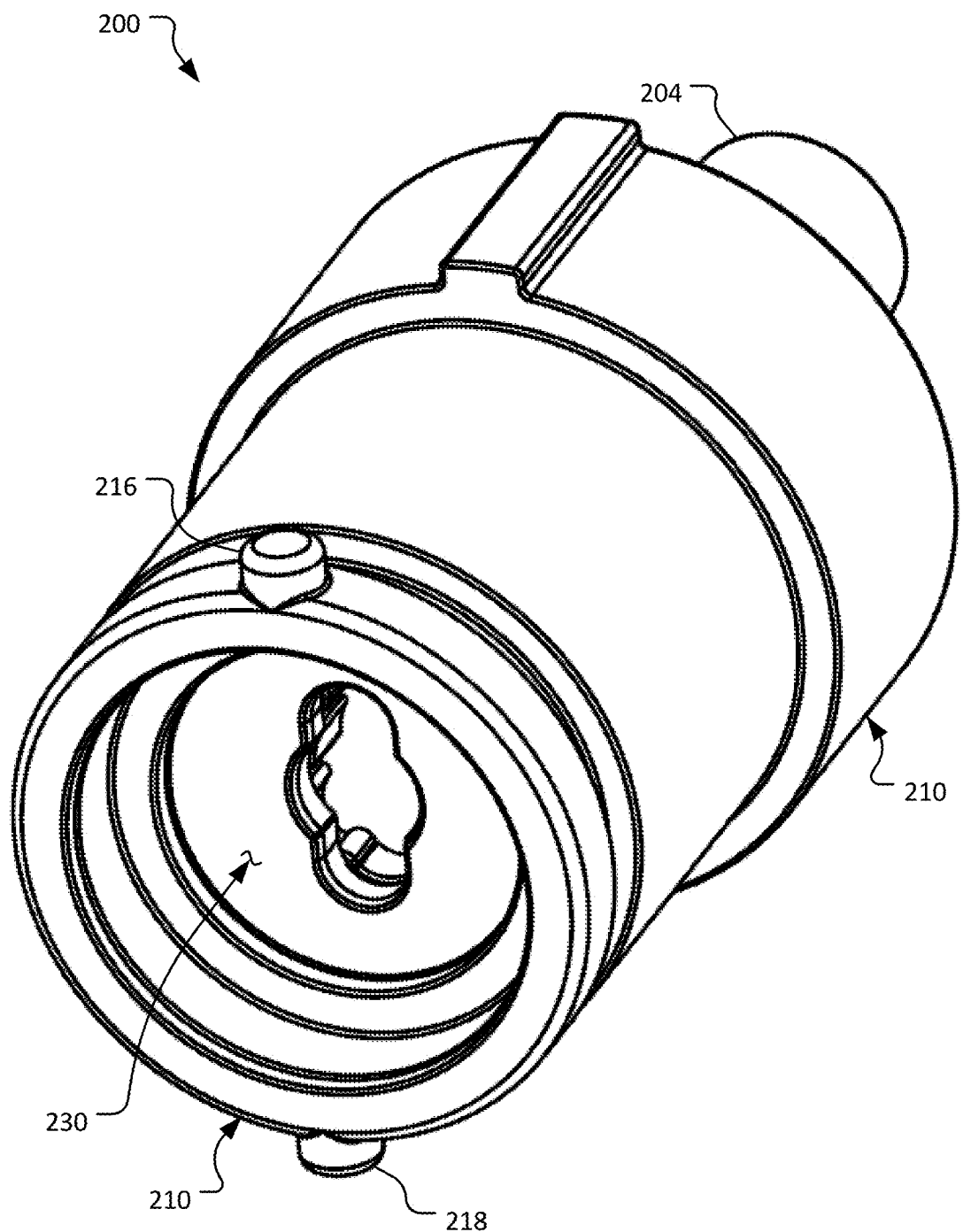
FIG. 18 is a perspective view of the male coupling of FIG. 1.
Figure 19:
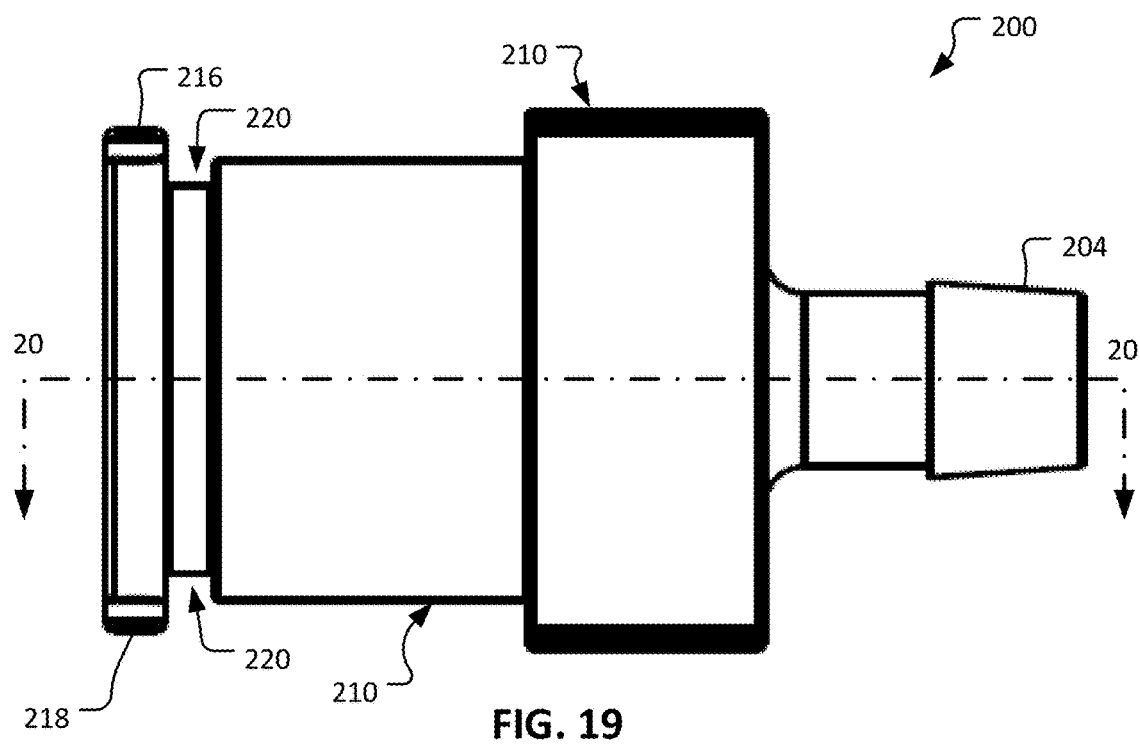
FIG. 19 is a side view of the male coupling of FIG. 1.

FIGS. 18 and 19 show external views of the male coupling 200 in greater detail. The male coupling 200 includes a male coupling body 210 and a male valve member 230. The valve member 230 is movably coupled within the coupling body 210. As described further below, the valve member 230 is rotatable and longitudinally translatable in relation to the coupling body 210. The rotational and translational motions of the valve member 230 occur as a result of the process of coupling the female coupling 100 to the male coupling 200. When the valve member 230 longitudinally translates relative to the coupling body 210, a flow path through the male coupling 200 is opened.

The male coupling 200 defines an annular latch groove 220 around its outer diameter. The engagement portion 135 of the latch member 130 (FIG. 9) seats within a portion of the latch groove 220 in order to latch or detain the female coupling 100 and the male coupling 200 together in the fully coupled arrangement (FIG. 2).

Figure 20:
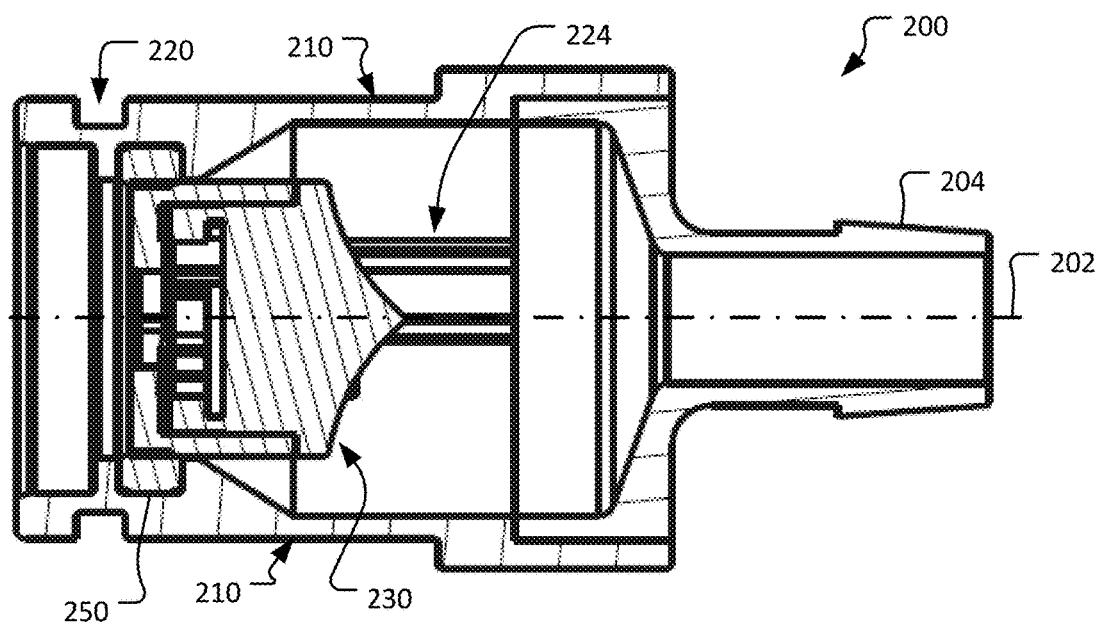
FIG. 20 is a longitudinal cross-section view of the male coupling of FIG. 1, taken along the cutting plane 20-20 indicated in FIG. 19.

In FIG. 20, a longitudinal cross-sectional view of the male coupling 200 is provided so that additional internal components are visible. The male coupling 200 can a longitudinal axis 202. An annular seal 250 is provided between the outer diameter of the male valve member 230 and an inner diameter of the male coupling body 210. Accordingly, in the depicted configuration the valve member 230 is in its closed position relative to the coupling body 210, and no fluid can flow through the male coupling 200.

Figure 30:
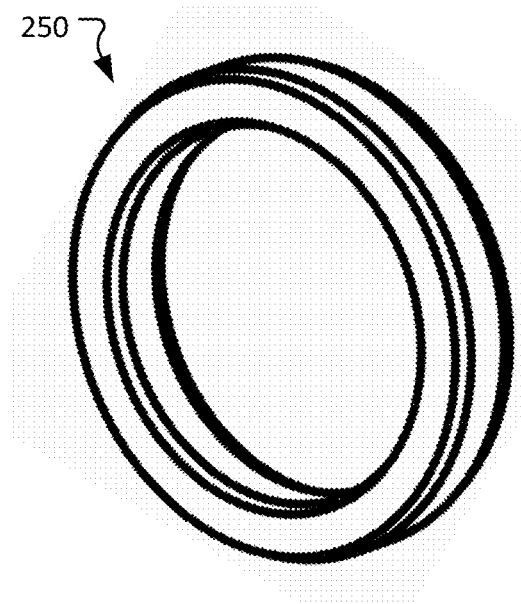
FIG. 30 is a perspective view of a seal of the male coupling of FIG. 1.
Figure 31:
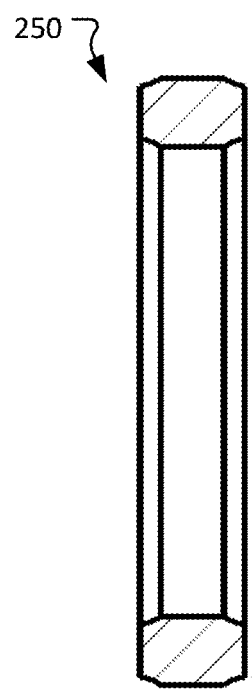
FIG. 31 is a longitudinal cross-section view of the seal of FIG. 30.

FIGS. 30 and 31 shown the annular seal 250 is shown in isolation from other components of the male coupling 200.

Figure 21:
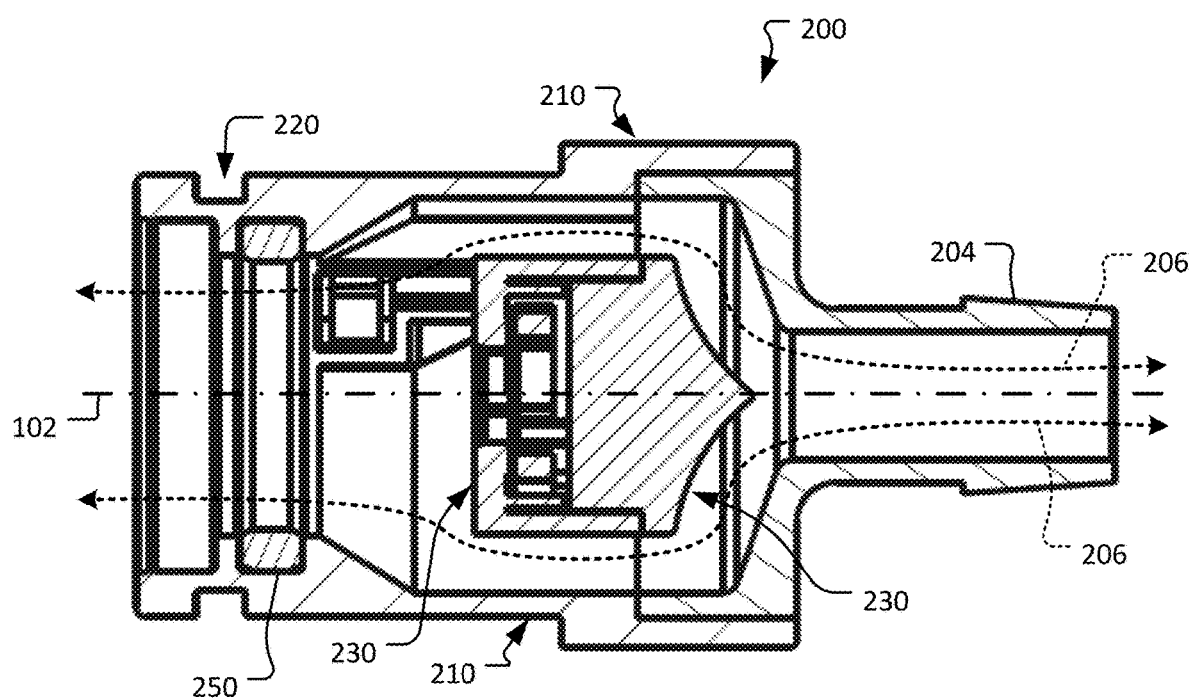
FIG. 21 shows the same longitudinal cross-section view as FIG. 20, but with the internal valve open to establish a fluid flow path through the male coupling.

In FIG. 21, the male coupling 200 is depicted in its open configuration such that an open flow path 206 through the male coupling 200 is established. The male valve member 230 is depicted in its open position relative to the coupling body 210. In the open position, the valve member 230 is out of contact with the seal 250.

Figure 22:
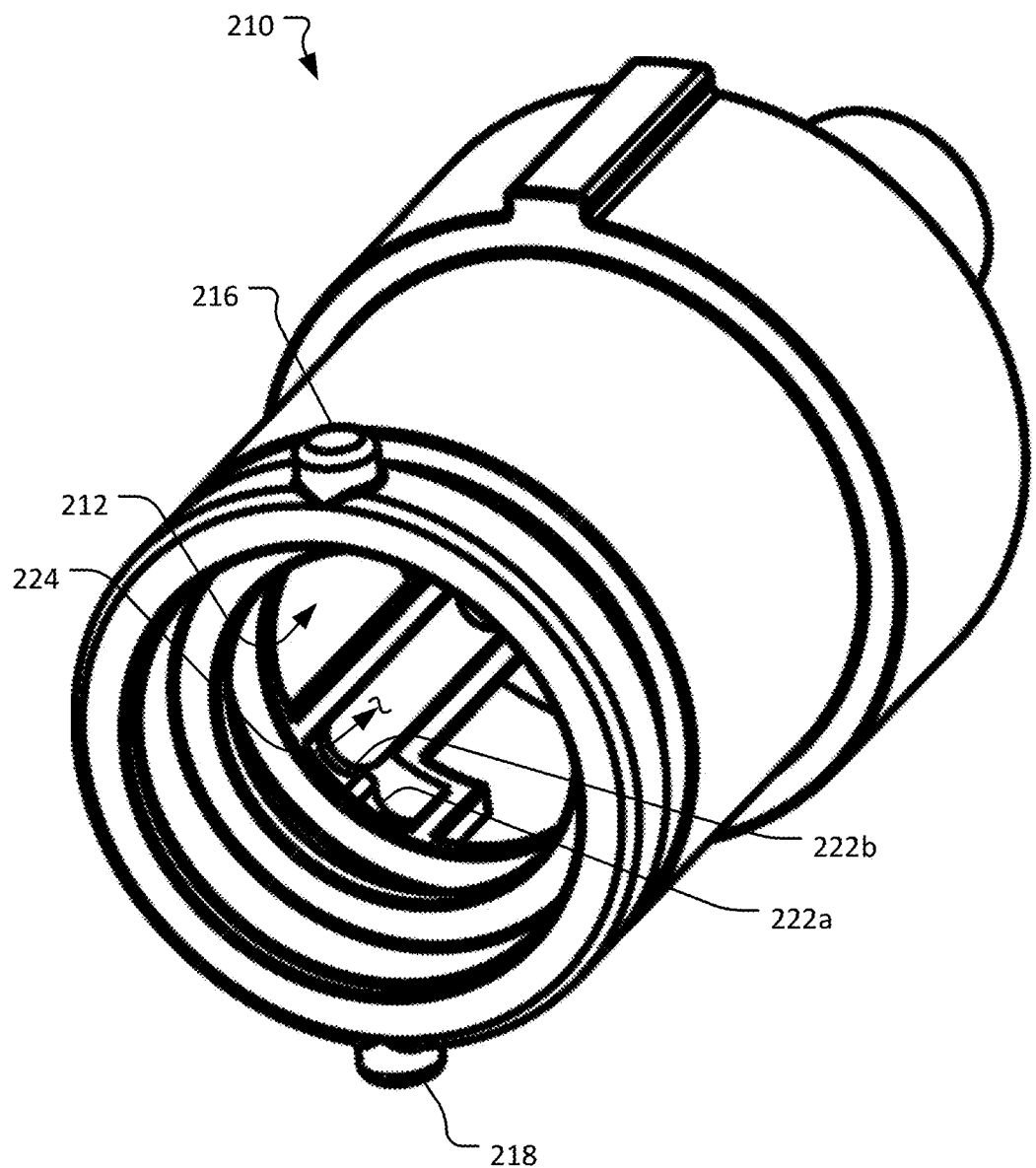
FIG. 22 is a perspective view of a main body of the male coupling of FIG. 1.

FIGS. 22-24 show the male coupling body 210 in isolation from other components of the male coupling 200. The male coupling body 210 defines an internal space 212. The male valve member 230 is movably disposed within the internal space 212 of the male coupling body 210. Moreover, the male coupling body 210 includes structural features to control and guide movements of the valve member 230 within the internal space 212. In particular, the male coupling body 210 includes first notches 222a, second notches 222b, and longitudinally extending grooves 224. While a single first notch 222a, a single second notch 222b, and a single groove 224 are visible in FIG. 22, the male coupling body 210 actually includes an additional first notch 222a, an additional second notch 222b, and an additional second groove 224 that are each disposed 180° opposite of the visible first notch 222a, second notch 222b, and groove 224, respectively. While each are disposed 180° opposite of each other, in some embodiments other arrangements/configurations can be used such as different angles and/or more or less than two notches/grooves. As described further below, the male valve member 230 includes radial projections 232 (FIG. 26) that are movably received within the notches 222a-b and grooves 224.

The first notches 222a define a home position for the male valve member 230. That is, while the projections 232 of the male valve member 230 are positioned in the first notches 222a, the male valve member 230 is in its closed position and the female coupling 100 can be uncoupled from the male coupling 100. The second notches 222b are aligned with the grooves 224. Accordingly, the second notches 222b act as an entry and exit location relative to the grooves 224. The grooves 224 define a longitudinal path along which the male valve member 230 travels (the radial projections 232 actually travel in the grooves 224) in a guided manner while the male valve member 230 moves between its open position (FIG. 21) and closed position (FIG. 20) relative to the male coupling body 210.

The male coupling body 210 also includes a first radial projection 216 and a second radial projection 218. The projections 216 and 218 are disposed 180° opposite of each other in the depicted embodiment. During the process of coupling or uncoupling the female coupling 100 and the male coupling 200, the projections 216 and 218 are received in the slots 116 and 118 defined by the female coupling body 210 (FIG. 8) and slidingly travel along the slots 116 and 118. Each of the projections 216 and 218 can be engaged in either the slot 116 or the slot 118. That is, the female coupling 100 and the male coupling 200 can be coupled by engaging either: (i) projection 216 with slot 116 and projection 218 with slot 118, or (ii) projection 216 with slot 118 and projection 218 with slot 116.

FIG. 25 shows a transverse cross-sectional view of the male coupling body 210 taken along cutting plane 25-25 of FIG. 23. The cutting plane 25-25 is located transversely through the area of the notches 222a-b. Accordingly, the notches 222a-b and the longitudinally extending grooves 224 are visible. Here it can be seen that the notches 222a-b are defined by arcuate leaf springs 225 that have a ridge 223 in a middle portion of the leaf springs 225. The first notches 222a and mirror images of the second notches 222b. The ends of the leaf springs 225 are each attached to the male coupling body 210. Accordingly, while the ends of the leaf springs 225 are supported, the unsupported portions of the leaf springs 225 are free to deflect radially (radially in the context of the male coupling body 210).

Separating each of the first notches 222a from their respectively adjacent second notch 222b is the ridge 223. The ridges 223 serve to releasably detain the projections 232 (FIG. 26) of the male valve member 230 in either the first notches 222a or the second notches 222b (which are aligned with the grooves 224). Such detainment is releasable because the ridges 223 are located at middle portions of the arcuate leaf springs 225, and the leaf springs 225 are flexible, compliant, springy, and therefore radially deflectable (elastically). That is, the projections 232 (which are radiused) can be moved from engagement with the first notches 222a to engagement with the second notches 222b (e.g., for subsequent engagement with the grooves 224), and vice versa, by manually rotating the female coupling 100 in relation to the male coupling 200 during the coupling and uncoupling processes. During such rotation, the ridges 223 of the leaf springs 225 are deflected radially outward because of unyielding forceful contact received from the projections 232 (which act like cams sliding on the deflectable cam surfaces of the leaf springs 225). After the deflection associated with moving the projections 232 between the notches 222a-b, the ridges 223 spring radially inward (rebound to the configuration shown) to again be in position to releasably detain the projections 232 in either the first notches 222a or the second notches 222b.

As described further below, the leaf springs 225 that define the ridges 223 are designed to deflect radially outward to allow the projections 232 to move between the notches 222a-b in response to the application of a particular specific threshold amount of torque between the female coupling 100 and the male coupling 200. The threshold amount of torque is essentially equal (e.g., within +/−10%) when the projections 232 are transitioning between the notches 222a-b in both directions. That is, the threshold amount of torque required to transition the projections 232 from the first notches 222a to the second notches 222b is essentially equal to the threshold amount of torque required to transition the projections 232 from the second notches 222b to the first notches 222a.

FIGS. 26-28 show the male valve member 230 in isolation from other components of the male coupling 200. The male valve member 230 is generally cylindrical, while including the pair of radial projections 232 that are disposed 180° opposite of each other. The front face of the male valve member 230 defines a recess 234. The recess 234 is shaped to receive the projection 160 of the valve stem head 152 (FIGS. 10-13) of the female coupling 100 so that the valve stem head 152 and the male valve member 230 can be releasably latched together in an abutted arrangement as described further below. Actually, the front face seal 194 of the seal member 190 (FIGS. 16 and 17) is disposed between the valve stem head 152 and the front face of the male valve member 230 when the two are releasably latched together in the abutted arrangement.

FIG. 29 shows a transverse cross-sectional view of the male valve member 230 that is taken along cutting plane 29-29 of FIG. 28. Here we can see the internal structure of the male valve member 230 that the projection 160 of the valve stem head 152 (FIGS. 10-13) interacts with when the projection 160 is inserted in the recess 234.

By virtue of the depicted internal structure of the male valve member 230, the projection 160 of the valve stem head 152 can be positioned in two different radial positions relative to the male valve member 230: (i) a longitudinally un-detained position and (ii) a longitudinally detained position. While the projection 160 is in the longitudinally un-detained position, the projection 160 can be longitudinally inserted and removed from engagement with the male valve member 230. While the projection 160 is in the longitudinally detained position, the projection 160 is longitudinally constrained from being unengaged from the male valve member 230. The projection 160 of the valve stem head 152 can be caused to transition between the two positions by manually rotating the female coupling 100 in relation to the male coupling 200 during the coupling and uncoupling processes, as described further below.

Similar to the internal structure of the male coupling body 210 as described above in reference to FIG. 25, the internal structure of the male valve member 230 includes a pair of flexible arcuate leaf springs 236. Each of the arcuate leaf springs 236 defines a longitudinally un-detained notch 237 (corresponding to the longitudinally un-detained position described above) and a longitudinally detained notch 239 (corresponding to the longitudinally detained position described above). Each un-detained notch 237 is separated from its adjacent detained notch 239 by a ridge 238. This structure functions like the radially flexible leaf springs 225 of the male coupling body 210 as described above, except that the un-detained notches 237 are asymmetrical in comparison to the detained notches 239. That asymmetry, in combination with the positioning and shape of notches 162 and 164 defined in the laterally extending arms of the T-shaped projection 160 (FIG. 13) of the valve stem head 152, establishes differing threshold torques associated moving the projections 160 from the un-detained notches 237 to the detained notches 239 as compared to the reverse (moving the projections 160 from the detained notches 239 to the un-detained notches 237). In particular, the threshold torque at which the T-shaped projection 160 of the valve stem head 152 can be moved from the un-detained notches 237 to the detained notches 239 is less than the threshold torque at which the T-shaped projection 160 of the valve stem head 152 can be moved from the detained notches 239 to the un-detained notches 237. In other words, it is easier (less torque required) to move the T-shaped projection 160 of the valve stem head 152 into the detained notches 239 than it is to move T-shaped projection 160 out of the detained notches 239.

Threshold torques have now been described for each of the following four actions that result from relative rotations between the female coupling 100 and the male coupling 200: (1) moving the projections 232 of the male valve member 230 from the first notches 222a to the second notches 222b, (2) moving the projections 232 from the second notches 222b to the first notches 222a, (3) moving the T-shaped projection 160 of the valve stem head 152 from the un-detained notches 237 to the detained notches 239, and (4) moving the T-shaped projection 160 from the detained notches 239 to the un-detained notches 237. As described above, the threshold torques for actions (1) and (2) are essentially equal (the torque required to move the male valve member 230 in either rotational direction in relation to the male coupling body 210 is about the same). However, the threshold torques for actions (3) and (4) are selected and designed to be different from each other, and different from the threshold torque of actions (1) and (2). In particular, action (3) has the lowest threshold torque, and action (4) has the highest threshold torque. Actions (1) and (2) have threshold torques that are between the threshold torques of (3) and (4). The relative levels of threshold torques of actions (1)-(4) are utilized during the coupling and uncoupling processes of the female coupling 100 and the male coupling 200.

Figure 32:
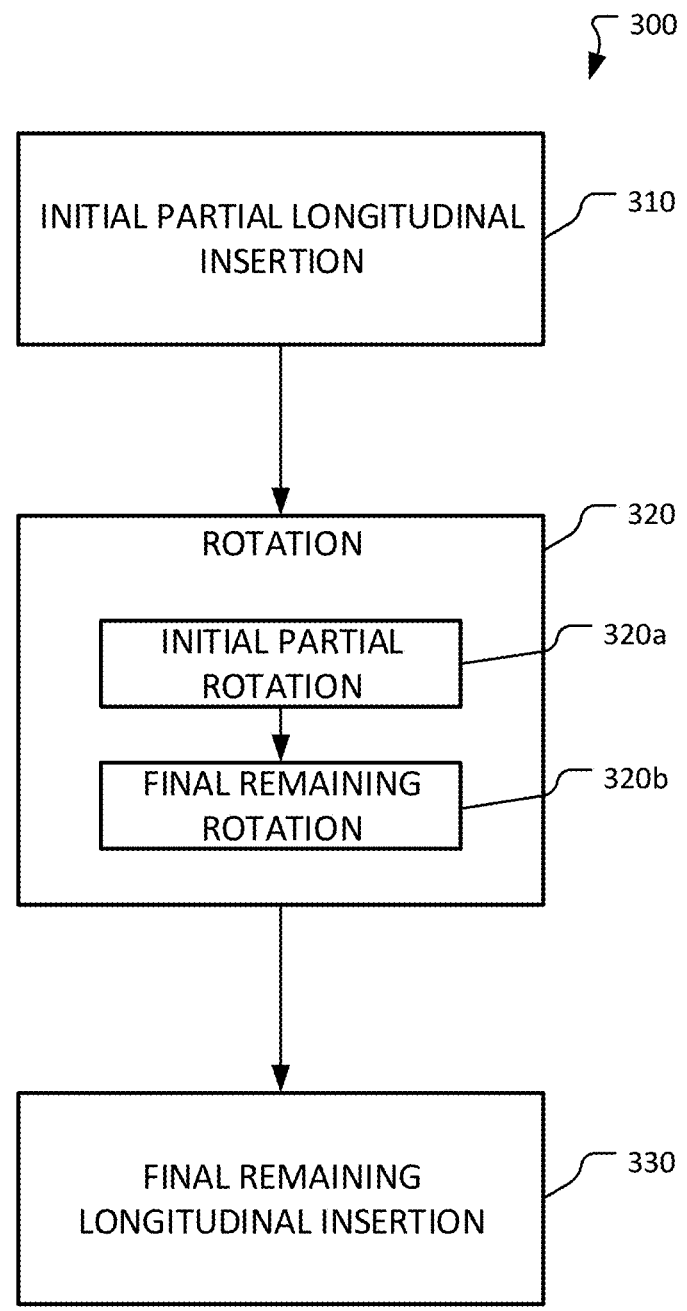
FIG. 32 is a flowchart describing a process for coupling the male and female couplings of FIG. 1 (to transition from the uncoupled arrangement of FIG. 1 to the coupled arrangement of FIG. 2).
Figure 47:
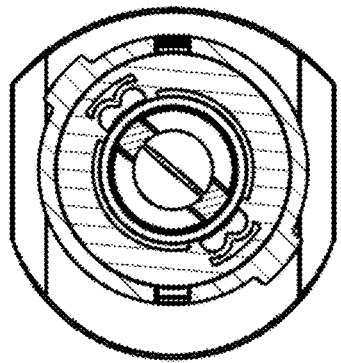
FIG. 47 is a transverse cross-section view of the male and female couplings of FIG. 1, taken along the cutting plane 47-47 indicated in FIG. 45.
Figure 45:
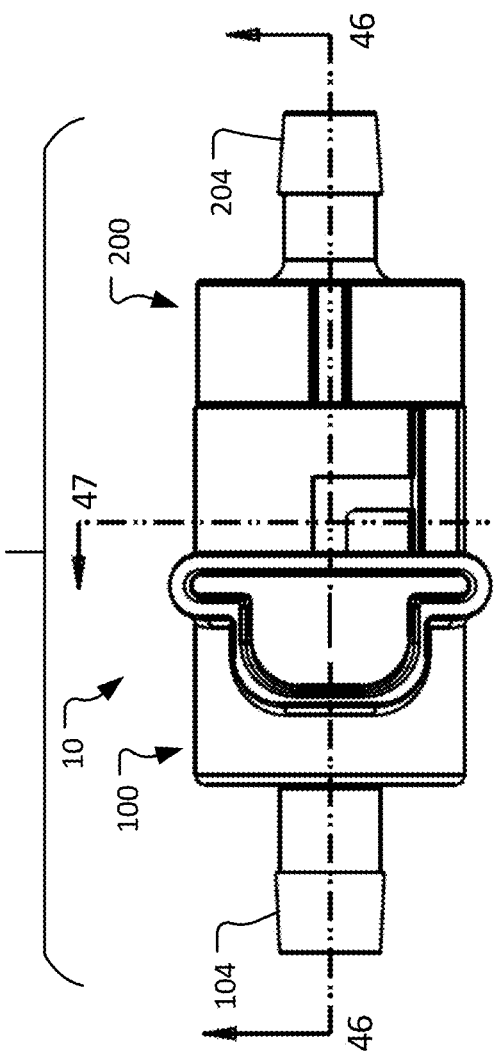
FIG. 45 is a side view of the male and female couplings of FIG. 1 arranged after a final longitudinal insertion.
Figure 46:
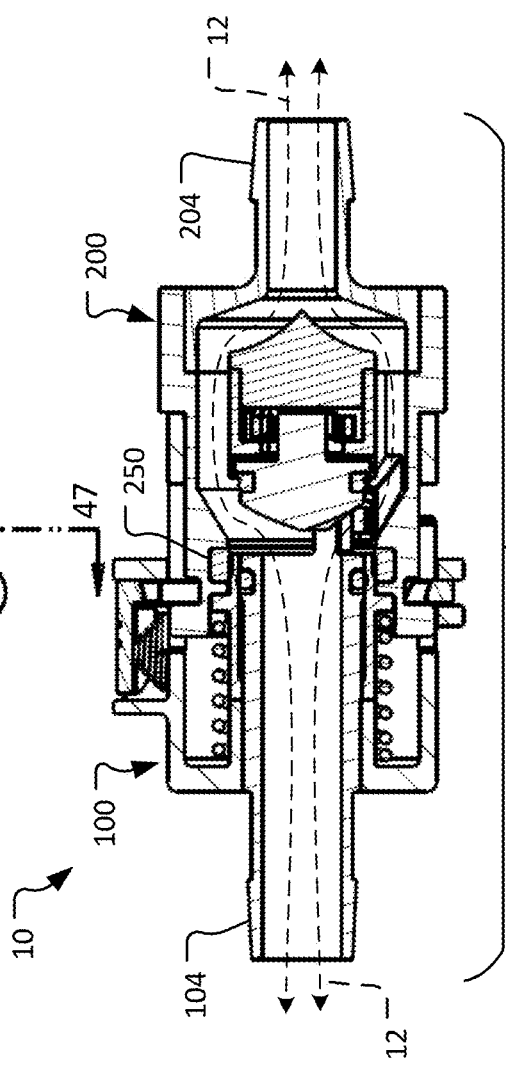
FIG. 46 is a longitudinal cross-section view of the male and female couplings of FIG. 1, taken along the cutting plane 46-46 indicated in FIG. 45.

FIG. 32 is a flowchart that describes a process 300 for coupling the female coupling 100 and the male coupling 200 (to transition from the uncoupled arrangement of FIG. 1 to the coupled arrangement of FIG. 2). This process is also illustrated in sequential FIGS. 33-47. The process 300 begins with the female coupling 100 separated from the male coupling 200 (as in FIG. 1). Also, the projections 232 of the male valve member 230 are positioned in the first notches 222a of the male coupling body 210 (FIGS. 25 and 26).

In step 310 of the process 300 (resulting in the arrangement of FIGS. 36-38), the female coupling 100 and the male coupling 200 are moved together longitudinally to become partially longitudinally engaged with each other. That is, the radial projections 216 and 218 of the male coupling 200 are longitudinally slid within, and to the ends of, the first portions 116a and 118a of the slots 116 and 118 of the female coupling 100. This action also results in the abutting of the valve stem head 152 against the front face of the male valve member 230 (with the front face seal 194 therebetween), and the positioning the T-shaped projection 160 of the valve stem head 152 in the un-detained notches 237 of the male valve member 230 (e.g., as visible in FIGS. 37 and 38). It should be noted that before, during, and after step 310, the projections 232 of the male valve member 230 are positioned in the first notches 222a of the male coupling body 210 (e.g., as visible in FIG. 38).

The rotation step 320 includes two sequential portions: (1) an initial partial rotation step 320a (resulting in the arrangement of FIGS. 39-41) and (2) a final remaining rotation step 320b (resulting in the arrangement of FIGS. 42-44). Both portions of the rotation step 320 involve the relative rotation between the female coupling 100 and the male coupling 200. During the rotation step 320, the first radial projection 216 of the male coupling 200 slides transversely along the arcuate middle portion 116b of the slot 116 of the female coupling 100, and the second radial projection 218 of the male coupling 200 slides transversely along the arcuate middle portion 118b of the slot 118 of the female coupling 100.

The transition from the initial partial rotation step 320a to the final remaining rotation step 320b takes place when the projections 216 and 218 reach an intermediate range portion of the middle portions 116b and 118b of the slots 116 and 118 (e.g., as visible in FIG. 39). At the end of the initial partial rotation step 320a, the T-shaped projection 160 of the valve stem head 152 has moved from the un-detained notches 237 to the detained notches 239 (e.g., as visible in FIG. 41). Accordingly, the valve stem 150 has thereby become longitudinally latched in an abutted arrangement with the male valve member 230. The initial partial rotation 320a results in the movement of the T-shaped projection 160 to the detained notches 239, rather than in the movement of the projections 232 of the male valve member 230 from the first notches 222a to the second notches 222b, because the threshold torque required to move the T-shaped projection 160 to the detained notches 239 is less than the threshold torque required to move the projections 232 to the second notches 222b.

The second portion of the rotation step 320 is the final remaining rotation step 320b. At the end of the final remaining rotation step 320b, the projections 216 and 218 reach the ends of the middle portions 116b and 118b of the slots 116 and 118 (e.g., as visible in FIG. 42). Also at the end of the final remaining rotation step 320b, the projections 232 of the male valve member 230 have moved from the first notches 222a to the second notches 222b (e.g., as visible in FIG. 44). Accordingly, the projections 232 of the male valve member 230 are now aligned with the longitudinally extending grooves 224 of the male coupling body 210 (in preparation for the final remaining longitudinal insertion of step 330).

In step 330 (resulting in the arrangement of FIGS. 45-47), the female coupling 100 and the male coupling 200 are further forced longitudinally toward each other to become fully longitudinally engaged with each other (to arrive at the operative coupled arrangement of FIG. 2). That is, the first radial projection 216 of the male coupling 200 is slid to the end of the third portion 116c of the slot 116 of the female coupling 100, and the second radial projection 218 of the male coupling 200 is slid to the end of the third portion 118c of the slot 118 of the female coupling 100. During this action, the projections 232 of the male valve member 230 slide longitudinally along the grooves 224 of the male coupling body 210. This action results in the latching of the female coupling 100 and the male coupling 200. That is, the latch member 130 of the female coupling 100 becomes seated in the latch groove 220 of the male coupling 200 to detain the fluid coupling system 10 in the releasably coupled arrangement. This action also results in opening the fluid flow path 12 (FIG. 46) through the coupled combination of the female coupling 100 and the male coupling 200. The fluid flow path 12 is open from the female coupling termination 104 to the male coupling termination 204 to allow flow through the fluid coupling system 10. That is, step 330 results in the longitudinal translation of the valve sleeve 170 in relation to the valve stem 150 to open the one or more openings 153 of the female coupling 100 (FIG. 7), and the longitudinal translation of the male valve member 230 relative to the male coupling body 210 (FIG. 21). Also, in this operative arrangement, the valve sleeve 170 of the female coupling 100 is in sealed contact with the annular seal 250 of the male coupling 200.

Figure 48:
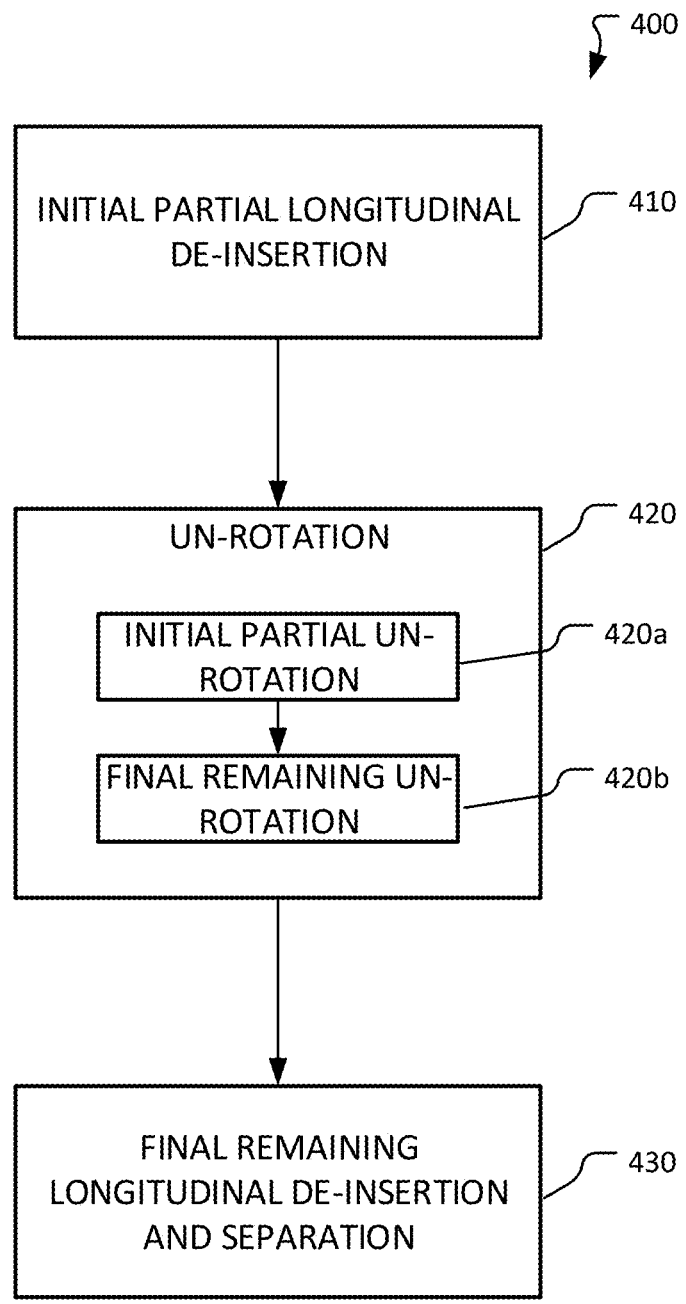
FIG. 48 is a flowchart describing a process for uncoupling the male and female couplings of FIG. 1 (to transition from the coupled arrangement of FIG. 2 to the uncoupled arrangement of FIG. 1).

FIG. 48 is a flowchart that describes a process 400 for uncoupling the female coupling 100 and the male coupling 200 (to transition from the operatively coupled arrangement of FIG. 2 to the uncoupled arrangement of FIG. 1). The process 400 is essentially the reverse of the process 300 for coupling the female coupling 100 and the male coupling 200. At the start of the process 400, the female coupling 100 and the male coupling 200 are in the fully coupled, operable arrangement of FIGS. 45-47, with the open fluid flow path 12. In that arrangement, the projections 232 of the male valve member 230 are within the grooves 224 of the male coupling body 210, and the T-shaped projection 160 is in the longitudinally detained notches 239.

In step 410, the latch member 130 is first manually depressed and then the female coupling 100 and the male coupling 200 are moved longitudinally away from each other to arrive at the arrangement of FIGS. 42-44. That is, the first radial projection 216 of the male coupling 200 is slid along the third portion 116c of the slot 116 of the female coupling 100 to the point of transition to the middle portion 116b, and the second radial projection 218 of the male coupling 200 is slid along the third portion 118c of the slot 118 of the female coupling 100 to the point of transition to the middle portion 118b. During this action, the projections 232 of the male valve member 230 slide longitudinally along the grooves 224 of the male coupling body 210 and end up positioned in the second notches 222b of the male coupling body 210. This action also results in closure of the previously existing open fluid flow path 12 through the female coupling 100 and the male coupling 200. The fluid flow path 12 closes during step 410 because the valve stem head 152 pulls the male valve member 230 to its closed position against the seal 250, and the valve spring 107 forces the valve sleeve 170 to its closed position.

The un-rotation step 420 includes two sequential portions: (1) an initial partial un-rotation step 420a (resulting in the arrangement of FIGS. 39-41) and (2) a final remaining un-rotation step 420b (resulting in the arrangement of FIGS. 36-38). Both portions of the un-rotation step 420 involve the relative rotation between the female coupling 100 and the male coupling 200. During the un-rotation step 420, the first radial projection 216 of the male coupling 200 slides transversely along the arcuate middle portion 116b of the slot 116 of the female coupling 100, and the second radial projection 218 of the male coupling 200 slides transversely along the arcuate middle portion 118b of the slot 118 of the female coupling 100.

The transition from the initial partial un-rotation step 420a to the final remaining un-rotation step 420b takes place when the projections 216 and 218 reach an intermediate range portion of the middle portions 116b and 118b of the slots 116 and 118 (e.g., as visible in FIG. 39). At the end of the initial partial un-rotation step 420a, the projections 232 of the male valve member 230 have moved from the second notches 222b to the first notches 222a, but the T-shaped projection 160 of the valve stem head 152 has remained in the detained notches 239 (e.g., as visible in FIG. 41). The initial partial un-rotation 420a results in the movement of the projections 232 of the male valve member 230 from the second notches 222b to the first notches 222a, rather than in the movement of the T-shaped projection 160 from the detained notches 239 to the un-detained notches 237, because the threshold torque required to move the projections 232 to the first notches 222a is less than the threshold torque required to move the T-shaped projection 160 from the detained notches 239 to the un-detained notches 237. As explained above, the notches 162 and 164 defined in the laterally extending arms of the T-shaped projection 160 (FIG. 13) of the valve stem head 152 together with the corresponding shape of the detained notches 239 establishes a higher threshold torque required for moving the projections 160 from the detained notches 239 than the threshold torque required for moving the projections 160 from the second notches 222b to the first notches 222a.

During the final remaining un-rotation step 420b the T-shaped projection 160 of the valve stem head 152 moves from the detained notches 239 to the un-detained notches 237 (e.g., as visible in FIG. 38). In that position, the valve stem 150 is no longer longitudinally detained in relation to the male valve member 230.

Lastly, the final remaining longitudinal de-insertion and separation step 430 can be performed by separating the female coupling 100 and the male coupling 200 to arrive at the uncoupled arrangement of FIG. 1.

Optional Features and Additional Embodiments

While the female coupling 100 and the male coupling 200 are described herein as having corresponding slots (e.g., slots 116 and 118) and radial projections (e.g., projections 216 and 218) that are arranged at 180° from each other, in some embodiments other arrangements can be utilized. For example, in some embodiments the angular orientation between the slots (and between the radial projections) can be an angle other than 180° (e.g., in a range between 0° to 90°, or 30° to 120°, or 60° to 150°, or 90° to 180°, or 120° to 210°, without limitation). A machine or assembly of two of more of the fluid coupling systems 10 may have two or more coupling pairs (female and male) that have individually differing angular orientations between the slots (and between the radial projections) to act as a failsafe means to ensure that the proper male and female couplings of the coupling pairs are used in conjunction with each other. This technique can also be known as "keying."

In some embodiments, the female coupling 100 and/or the male coupling 200 can be made with a capability to swivel. That is, the terminations of the couplings (e.g., the female coupling termination 104 and/or the male coupling termination 204) can be made to allow rotation of the terminations around the longitudinal axes of the couplings in relation to the other portions of the couplings. Such a feature can help to prevent kinking of tubing that is connected to the terminations of the couplings.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A female fluid coupling, comprising:
   a coupling body defining a longitudinal axis and an internal space;
   a valve stem disposed within the internal space;
   a valve stem head attached at an end of the valve stem and comprising a protuberance extending from a front face of the valve stem head along the longitudinal axis;
   a seal member attached to the valve stem head and covering the front face of the valve stem head; and
   a valve sleeve that is movable, along the valve stem, relative to the coupling body and the valve stem head between: (i) a closed position in which the valve sleeve is in contact with the seal member and (ii) an open position in which the valve sleeve is longitudinally spaced apart from the seal member to open a fluid flow path through the female fluid coupling,
   wherein the protuberance extends through an opening defined by the seal member, and
   wherein, while the valve sleeve is in the closed position:
      an annular front face of the valve sleeve contacts the seal member; and
      an inner diameter wall of the valve sleeve contacts the seal member.

2. The female coupling of claim 1, wherein the seal member extends over and covers an outer diameter of the valve stem head.

3. The female coupling of claim 1, wherein the seal member includes an engagement portion that seats within an annular groove defined by the valve stem head.

4. The female coupling of claim 1, wherein the seal member comprises three compliant sealing regions.

5. The female coupling of claim 1, further comprising a spring arranged to bias the valve sleeve to the closed position.

6. The female coupling of claim 1, further comprising a mechanism coupled to the coupling body and configured to latch a mated male coupling to the female coupling, the mechanism being movable between a latched arrangement and an unlatched arrangement.

7. The female coupling of claim 1, wherein the protuberance is T-shaped.

8. The female coupling of claim 7, wherein the T-shaped protuberance includes two arms extending in opposite directions transverse to the longitudinal axis.

9. The female coupling of claim 7, wherein the T-shaped protuberance includes two arms extending in opposite directions transverse to the longitudinal axis, and wherein each arm defines a notch in its outer profile.

10. A fluid coupling system, comprising:
    a male coupling comprising:
       a male coupling body defining a male longitudinal axis and a male coupling internal space; and
       a male valve member disposed within the male coupling internal space, wherein the male valve member is movable, along the male longitudinal axis, relative to the male coupling body to open and close a flow path through the male coupling; and
    a female coupling comprising:
       a female coupling body defining a female longitudinal axis and a female coupling internal space;
       a valve assembly disposed within the female coupling internal space and comprising a valve stem head and a valve sleeve, wherein the valve sleeve is movable, along the female longitudinal axis, relative to the female coupling body and the valve stem head between: (i) an open position that allows fluid flow through the female coupling and (ii) a closed position that blocks the fluid flow through the female coupling; and
       a seal member attached to the valve stem head and that seals against the valve sleeve when the valve sleeve is in the closed position,
    wherein the valve stem head comprises a protuberance extending from a front face of the valve stem head along the female longitudinal axis,
    wherein the protuberance extends through an opening defined by the seal member, and
    wherein a portion of the seal member is in contact with a front end face of the male valve member when the male coupling and the female coupling are connected together.

11. The fluid coupling system of claim 10, wherein, while the male coupling and the female coupling are connected together, the portion of the seal member is compressed between: (i) the front face of the valve stem head and (ii) a front face of the male valve member.

12. The fluid coupling system of claim 10, wherein the valve stem head and the male valve member include complementary structures to latch them together in an abutted arrangement.

13. The fluid coupling system of claim 12, wherein the complementary structures include:
  the protuberance extending from the front face of the valve stem head; and
  a recess defined by a front face of the male valve member, wherein the recess is shaped to receive the protuberance.

14. The fluid coupling system of claim 13, wherein the protuberance is a T-shaped projection.

15. The fluid coupling system of claim 10, wherein the female coupling includes a spring arranged to bias the valve sleeve against the valve stem head to close the flow path through the female coupling.

16. The fluid coupling system of claim 15, wherein the male coupling is spring-less.

17. The fluid coupling system of claim 10, wherein the seal member extends over and covers an outer diameter of the valve stem head.

18. The fluid coupling system of claim 10, wherein the seal member includes an engagement portion that seats within an annular groove defined by the valve stem head.

19. The fluid coupling system of claim 10, wherein the male coupling includes two arcuate leaf springs, and wherein each arcuate leaf spring has a ridge in a middle portion of the arcuate leaf spring.

\* \* \* \* \*